US009544074B2

(12) United States Patent
Li et al.

(10) Patent No.: US 9,544,074 B2
(45) Date of Patent: Jan. 10, 2017

(54) TIME-SHIFTING DISTRIBUTION OF HIGH DEFINITION AUDIO DATA

(75) Inventors: Gordon Yong Li, San Diego, CA (US); Xuemin Chen, Rancho Santa Fe, CA (US)

(73) Assignee: Broadcom Corporation, Irvine, CA (US)

( * ) Notice: Subject to any disclaimer, the term of this patent is extended or adjusted under 35 U.S.C. 154(b) by 995 days.

(21) Appl. No.: 13/602,733

(22) Filed: Sep. 4, 2012

(65) Prior Publication Data

US 2014/0067381 A1    Mar. 6, 2014

(51) Int. Cl.
| | | |
|---|---|---|
| H04M 1/64 | (2006.01) | |
| H04H 60/27 | (2008.01) | |
| H04N 21/439 | (2011.01) | |

(52) U.S. Cl.
CPC .......... *H04H 60/27* (2013.01); *H04N 21/4398* (2013.01)

(58) Field of Classification Search
CPC ..................................................... H04H 60/27
See application file for complete search history.

(56) References Cited

U.S. PATENT DOCUMENTS

| | | | | |
|---|---|---|---|---|
| 7,450,570 | B1 * | 11/2008 | Barzegar | ................. H04L 12/66 370/352 |
| 2003/0125095 | A1 | 7/2003 | Hwang | |
| 2006/0023747 | A1 | 2/2006 | Koren et al. | |
| 2006/0161635 | A1 | 7/2006 | Lamkin et al. | |
| 2006/0190254 | A1 * | 8/2006 | Iser | ....................... G10L 21/038 704/243 |
| 2007/0025343 | A1 | 2/2007 | Singh et al. | |
| 2007/0140456 | A1 * | 6/2007 | Rodman | ................ H04M 3/567 379/202.01 |
| 2007/0213980 | A1 | 9/2007 | Danner et al. | |
| 2009/0018912 | A1 | 1/2009 | Altberg et al. | |
| 2010/0060784 | A1 | 3/2010 | Ansari | |
| 2011/0096918 | A1 | 4/2011 | Lee | |
| 2011/0295598 | A1 | 12/2011 | Yang et al. | |

FOREIGN PATENT DOCUMENTS

| | | |
|---|---|---|
| CN | 1997047 A | 7/2007 |
| CN | 201868109 U | 6/2011 |
| WO | WO 02/28063 A2 | 4/2002 |

OTHER PUBLICATIONS

Chinese Office Action, dated Mar. 9, 2015, pp. 1-6, issued in Chinese Patent Application No. 201310397607.3, State Intellectual Property Office of the P.R. China, Beijing, China.

Partial European Search Report, dated Sep. 8, 2014, pp. 1-5, issued in European Patent Application No. 13004057.9, European Patent Office, Munich, Germany.

* cited by examiner

*Primary Examiner* — Joseph T Phan
(74) *Attorney, Agent, or Firm* — Brinks Gilson & Lione

(57) ABSTRACT

A system may time-shift the distribution high-definition (HD) audio. The system can obtain an audio stream from a specified audio source, transcode the audio stream into an HD audio stream, and store the HD audio stream in a memory. The system may later forward the stored HD audio stream to a destination device, which can be a communication device linked to the system through a local telephone network or a remote communication device. The system can also store HD audio when a local communication device receives an incoming call request that interrupts a current HD audio distribution process. The system may resume distribution of the HD audio after processing the incoming call request from a point when the distribution was interrupted.

20 Claims, 20 Drawing Sheets

TIME-SHIFTING DISTRIBUTION OF HIGH DEFINITION AUDIO DATA

TECHNICAL FIELD

This disclosure relates an audio distribution system. This disclosure also relates to a high definition (HD) audio distribution system.

BACKGROUND

Advances in electronics and communication technologies can result in communication networks capable of communicating data at ever-increasing speeds. Consumers may be able to send and receive data across multitudes of sources at higher reliability and communication rates. Technology can continue to advance and communication networks grow in size, frequency of use and capability. Data can be being communicated with greater efficiency, reliability and quality.

BRIEF DESCRIPTION OF THE DRAWINGS

The systems and methods may be better understood with reference to the following drawings and description. In the figures, like reference numerals designate corresponding parts throughout the different views.

DETAILED DESCRIPTION

The discussion below makes reference to High Definition (HD) audio, which may include wideband audio or HD Voice data, signals, and/or technology. HD audio, wideband audio, or HD Voice may refer to an audio signal having a frequency range greater than a traditional telephonic voiceband or narrowband signal, e.g., a telephonic narrowband signal between 300 Hz to 3.4 kHz. HD audio, wideband audio, or HD voice may also refer to a telephony audio signal that has a greater frequency range than a traditional narrowband telephony signal. For instance, HD audio may include an audio signal ranging between any portion of the human voice frequency range. As one example, HD audio, wideband audio, or HD Voice may include audio frequencies ranging between 50 Hz to 7 kHz or higher, providing greater audio clarity and transmission fidelity than a traditional narrowband telephony signal. HD audio may also include audio signals encoded according any number of codecs, such as wideband or HD Voice audio codecs including G.722, Silk, Siren, internet Speech Audio Codec (iSAC), or other codecs. HD audio may be supported by any number of electronic or telephonic devices, including as examples analog telephones, Internet Protocol (IP) telephones, cordless systems (e.g., a base station and a handset), cellular phones, laptops, televisions, stereos, video conferencing devices, portable music players, and other devices.

Figure 1:
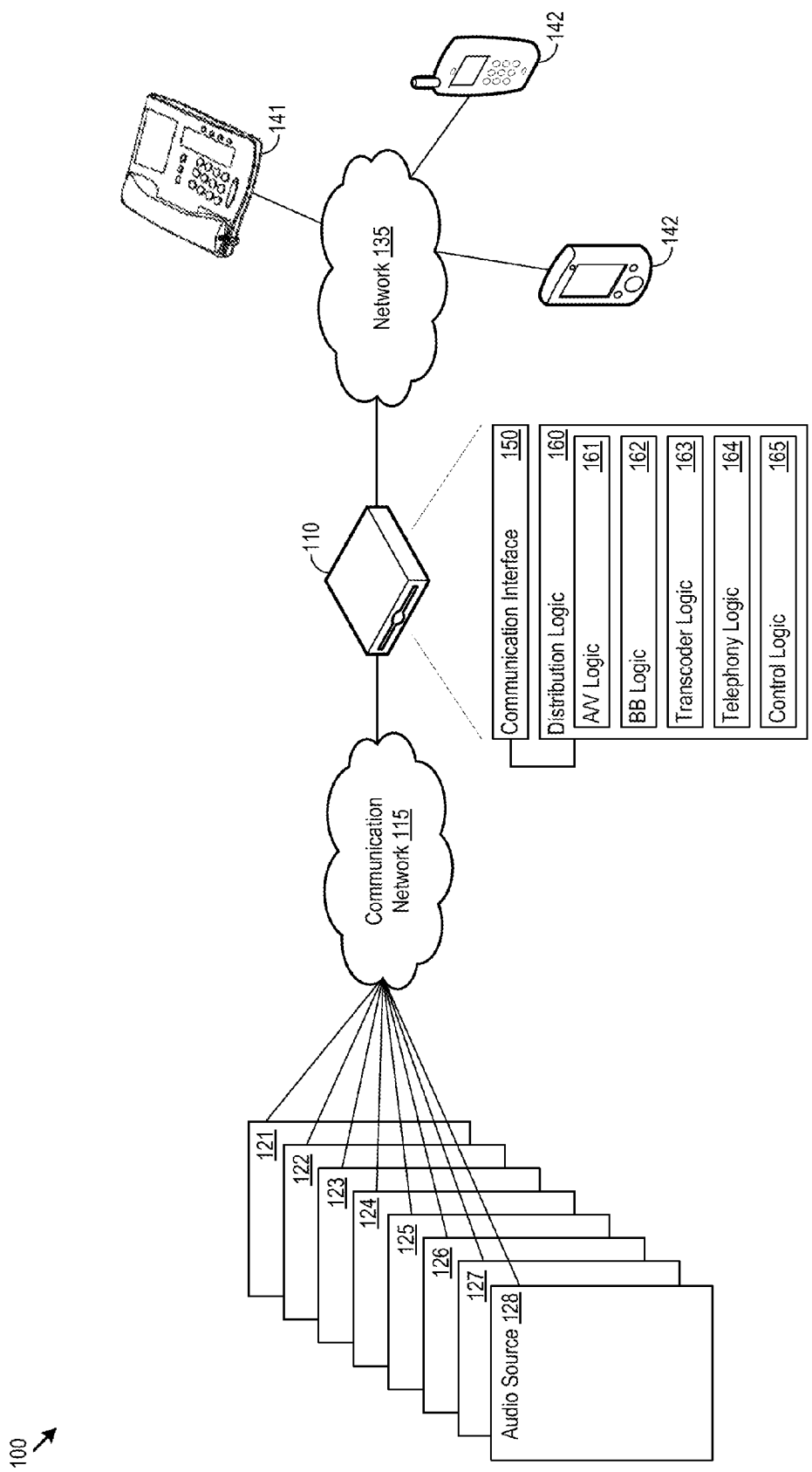
FIG. 1 shows an example of a system for distributing High Definition (HD) audio.

FIG. 1 shows an example of a system 100 for distributing HD audio. The exemplary system 100 includes a distribution device 110. The distribution device 110 may be any electronic device that receives audio data in any form. For example, the distribution device 110 may be a set-top box, a gateway device, a cable modem, a desktop computer, a laptop computer, and other electronic devices. The distribution device 110 may communicate across a communication network 115 and receive audio or audio/visual (A/V) data from any number of audio sources. In FIG. 1, the distribution device 110 may communicate across the communication network 115 to receive audio data from any of the audio sources labeled as audio sources 121-128. An audio source may include any source that provides audio data. As examples, audio sources may include real-time (e.g., live) A/V broadcast sources, video-on national or local television broadcast networks, Internet-based A/V providers (e.g., audio streaming websites over an IP network), on-demand sources (e.g., a video on-demand service), Satellite audio providers, Broadcast radio sources, audio servers storing and/or providing A/V data files, and more.

The communication network 115 may include any number of networks that communicate audio data according to any number of communication standards or protocols. As examples, the communication network 115 may include a cable network that transports audio data according to a cable standard (e.g., OpenCable and PacketCable) or any number of Internet Protocol (IP) networks that transport audio data as IP data, e.g., packets. As additional examples, the communication network 115 may communicate across any of the following network technologies, topologies, mediums, or standards: Ethernet, cable (e.g. DOCSIS), OpenCable, PacketCable, DSL, Multimedia over Coax Alliance (MoCA), power line (e.g. HomePlug AV), Ethernet Passive Optical Network (EPON), Gigabit Passive Optical Network (GPON), Hybrid Fibre Coaxial (HFC) access network, Public Switched Telephone Network (PSTN), any number of cellular standards (e.g., 2G, 3G, Universal Mobile Telecommunications System (UMTS), GSM (R) Association, Long Term Evolution (LTE) (TM), or more), WiFi (including 802.11 a/b/g/n/ac), WiMAX, Bluetooth, WiGig, and others. In one example, the communication network 115 may include multiple networks through which the distribution device 110 receives audio data. For example, the distribution device may receive an A/V broadcast from a first audio source across a cable network in the communication network 115 as well as an Internet streamed audio signal from a second audio source across an Ethernet network in the communication network 115.

The distribution device 110 may also distribute audio data across any number of networks to any number of destinations. In FIG. 1, the distribution device 110 may communicate across a network 135, such as a local network or local area network (LAN), to distribute HD audio data. The network 135 may be implemented according to any of the network technologies, topologies, mediums, or standards enumerated above. In one example, the network 135 may is implemented as an analog network, such as an analog telephone network. For instance, the network 135 may be implemented as an analog telephone network according to a Registered Jack (RJ) interface standard, such as RJ11, RJ14, RJ21, RJ45, RJ48, or others. The network 135 may be implemented within a particular location, such as a residential home, a business office, a conferencing center, or other locations. Or, the network 135 may be implemented across any number of locations as well.

The distribution device 110 may communicate with any number of electronic devices across the network 135, such as the telephone 141, cellular phone 142, and personal data assistant (PDA) 143. Particularly, the distribution device 110 may distribute audio data obtained from an audio source to any number of electronic devices, e.g., by sending HD audio data across the network 135 to any of the electronic devices supporting HD audio data. To that end, the distribution device 110 may include a communication interface 150 and distribution logic 160. The communication interface 150 may be configured to communicate across multiple communication networks, including any networks comprising the communication network 115 and the network 135. The distribution logic 160 may distribute audio data to any number of electronic devices communicatively linked to the distribution logic 160, including the phone 141, cellular phone 142, and personal data assistant (PDA) 143. Additional examples of electronic devices may include a VoIP phone, speaker phone, cordless handset, earphone, audio player, laptop, television, stereo, video conferencing device, portable music player, and others. When a particular electronic device, e.g., the telephone 141, is referred to in the figures, the device may include any electronic device that can perform similar functions, such as any of the mentioned electronic devices.

The distribution logic 160 may include any amount of logic to obtain and distribute audio data. For instance, the distribution logic 160 may include logic to obtain audio data from various audio sources. In the example in FIG. 1, the distribution logic 160 includes the A/V logic 161 and broadband logic 162 that may be configured to obtain audio data from various audio sources. The distribution logic 160 may also include transcoder logic 163, telephony logic 164, and control logic 165, which are described in greater detail below. As seen in FIG. 1, each portion of the distribution logic 160 is implemented by the distribution device 110. However, the distribution logic 160, including any combination of the A/V logic 161, communication logic 162, transcoder logic 163, telephony logic 164, and control logic 165, may be implemented across multiple devices as well.

The A/V logic 161 may be configured to receive A/V data from any number of audio sources. Received A/V data may include audio data, video data, or both. Examples of A/V data include video programs or audio programs broadcasted across any number of broadcast channels, e.g., by a local or national broadcast network. The A/V logic 161 may receive A/V data broadcasted across any number of communication mediums, such as through a cable network, through satellite, or others. In one implementation, A/V logic 161 may decode A/V data for display by a television. The A/V logic 161 may also extract data with respect to an audio portion of A/V data. For example, the A/V logic 161 may determine an audio codec used to encode an audio portion of received A/V data.

The broadband logic 162 may be configured to support communications across a broadband network, e.g., communications to receive or send audio data. In one example, the broadband logic 162 implements a communication modem, such as a cable modem. The broadband logic 162 may act, for example, as an IP front end for a Voice over IP (VoIP) client, such as the telephony logic 164. In this example, the broadband logic 162 may receive or distribute audio data across an IP network as VoIP data packets. The broadband logic 162 may also receive A/V data as packet data and forward the received IP A/V data to the A/V logic 161 for decoding.

The transcoder logic 163 may transcode audio data from an initial audio codec to a different audio codec. For example, the transcoder logic 163 may transcode received A/V data from an initial audio codec into an HD audio codec, such as G.722, to obtain HD audio data. The transcoder logic 163 may receive audio data for transcoding from multiple sources, such as communication logic including the A/V logic 161 or the broadband logic 162. Also, the transcoder logic 163 may send transcoded audio data, e.g., HD audio data, for distribution across a communication network, e.g., a local network, through other logic implemented by the distribution logic 160, e.g., the telephony logic 164.

The telephony logic 164 may implement logic to perform or support performing a phone call via any number of interfaces, including initiating a call connection, establishing a call connection, identifying incoming call requests, and other call functionality. For example, the telephony logic 164 may implement VoIP functionality to support performing a VoIP call, e.g., by implementing a VoIP client. The telephony logic 164 may also receive transcoded audio data, e.g., HD audio data to decode or encode into any number of communication formats, including communication formats supported by the communication network 115, network 135, or both. For example, the telephony logic 164 may decode a stream of HD audio data to communicate across an analog telephony interface.

In supporting telephony communications, the telephony logic 164 may also identify control signals sent from a communication device linked to the telephony logic 164, e.g., the telephone 141. In one example, the telephony logic 164 may identify Dual-Tone Multi-Frequency (DMTF) tones sent from a communication device. The telephony logic 164 may determine whether the control signals sent from the communication device specify an outgoing phone call or other control signaling relating the distribution of an HD audio data stream.

The control logic 165 may control the distribution of an audio stream across the network 135 or communication network 115. As discussed above and in greater detail below, the control logic 165 may communicate with other portions of the distribution logic 160 to coordinate distribution of an HD audio signal among the A/V logic 161, the broadband logic 162, the transcoder logic 164 and the telephony logic 165. While the example in FIG. 1 depicts one example of the distribution logic 160, the system 100 may be implemented across any number of logic or devices as well.

Figure 2:
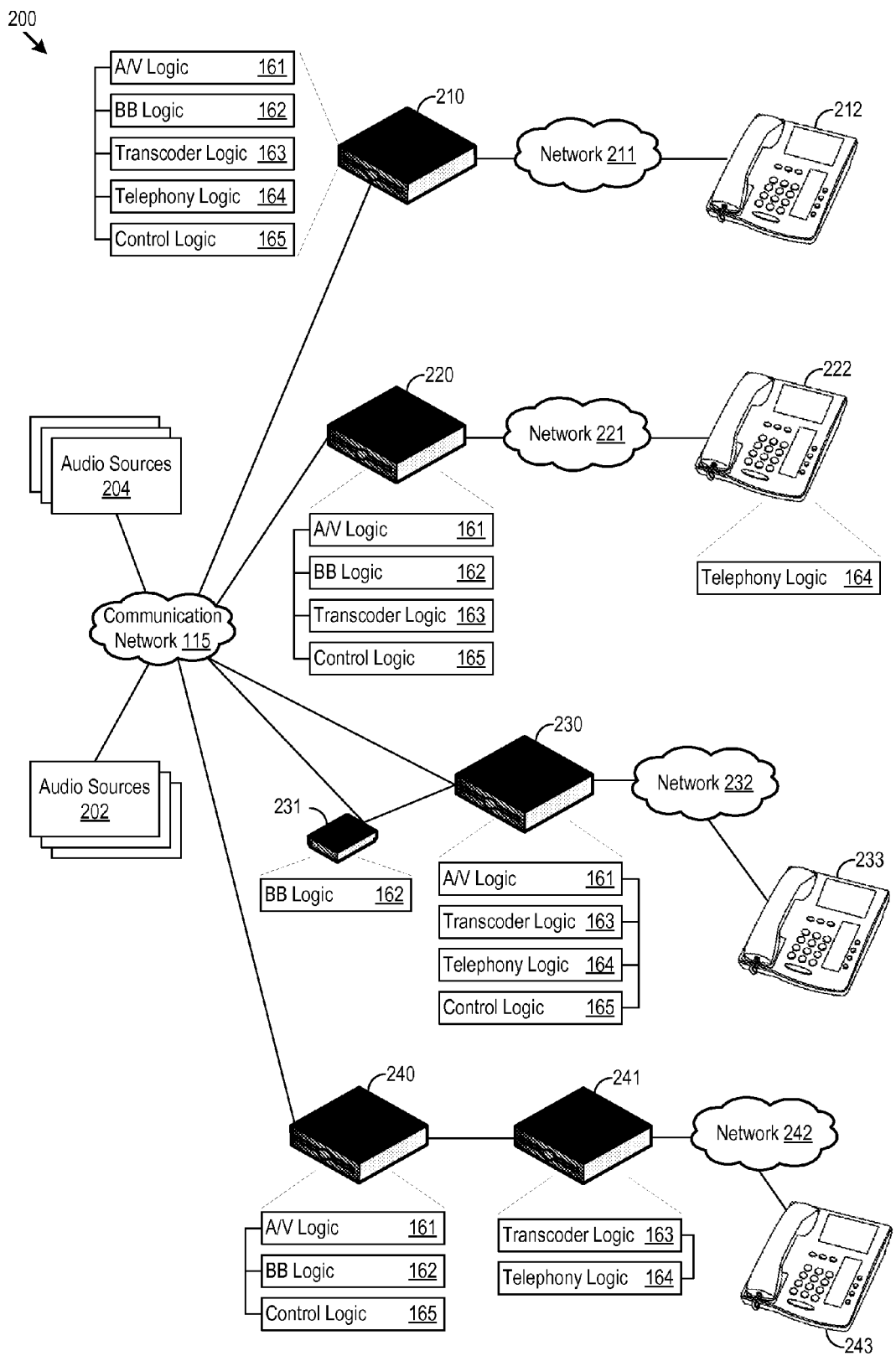
FIG. 2 shows an example of a system that includes four exemplary configurations for distributing HD audio.

FIG. 2 shows an example of a system 200 that includes four exemplary distribution configurations for distributing HD audio. Each of the distribution configurations may communicate across a communication network 115 to obtain audio data from any number audio sources, such as the audio sources labeled as audio sources 202 and 204 in FIG. 2.

FIG. 2 depicts a first exemplary distribution configuration that includes a distribution device 210, a network 211, such as a local analog network, and a phone 212. The distribution device 210 may be similar to the distribution device 110 described in FIG. 1 above. In the first configuration, the distribution device 210 implements multiple portions of the distribution logic 160, including the A/V logic 161, broadband logic 162, transcoder logic 163, telephony logic 164, and control logic 165. The network 211 may be implemented through standard telephone wiring, e.g., via RJ-11 telephone jacks. In operation, the distribution device 210 may obtain audio data from an audio source, e.g., among the audio sources 202 or 204, transcode the obtained audio data into HD audio data, decode the HD audio data into a decoded HD audio stream supported by analog interfaces to the network 211, and send the decoded HD audio stream across the network 211 to the phone 212 for playback.

A second exemplary distribution configuration is depicted in FIG. 2 that includes a distribution device 220, a network 221, such as an Internet Protocol (IP) network, and a phone 222. In the second distribution configuration, the distribution device 220 may implement a first portion of the distribution logic 160, including the A/V logic 161, broadband logic 162, transcoder logic 163, and control logic 165. The phone 222 may implement the telephony logic 164. In operation, the distribution device 220 may transcode received audio or A/V data into HD audio data and transmit the HD audio data across the network 221 as VoIP packets, e.g., via the broadband logic 162. The telephony logic 164 of the phone 222 may receive the VoIP packets and playback the HD audio data via the phone 222.

FIG. 2 depicts a third exemplary distribution configuration that includes a distribution device 230, an external modem 231, a network 232, such as a local analog network, and a phone 233. In this configuration, the distribution device 230 implements the A/V logic 161, transcoder logic 163, telephony logic 164, and control logic 165. The external modem 231 may be any communication device implementing the broadband logic 162, e.g., an external cable modem.

The fourth exemplary distribution configuration in FIG. 2 includes a first distribution device 240, a second distribution device 241, a network 242, such as a local analog network, and a phone 243. The distribution logic 160 may be implemented across any number of distribution devices. As seen in this fourth configuration, the first distribution device 240 implements the A/V logic 161, broadband logic 162, and control logic 165. The second distribution device 241 implements the transcoder logic 163 and the telephony logic 164. The first distribution device 240 and the second distribution device 241 may be communicatively linked, for example, via any of the communication protocols or methods enumerated above. As one example, the first distribution device 240 and the second distribution device 241 may communicate across an internal cable network via the MoCA standard.

In operation, the first distribution device 240 may communicate across the communication network 115 via the A/V logic 161 or broadband logic 162 to obtain audio data from an audio source. The first distribution device 240 may send the obtained audio data, as natively coded, to the second distribution device 241. The second distribution device 241 may then transcode, decode, and distribute the HD audio data across the network 242, e.g., via an analog interface, for playback by the phone 243. As one example, the first distribution device 241 may be a primary set-top box or gateway device located within a residential home and the second distribution device 242 may be an auxiliary set-top box also located within the residential home.

The examples and figures below are discussed with respect to the first distribution configuration that may include a distribution device 110 or 210 implementing the A/V logic 161, broadband logic 162, transcoder logic 163, telephony logic 164, and control logic 165. However, each of the examples and figures discussed below may also apply to any other distribution configuration, including any of the exemplary distribution configurations in FIG. 2.

Figure 3:
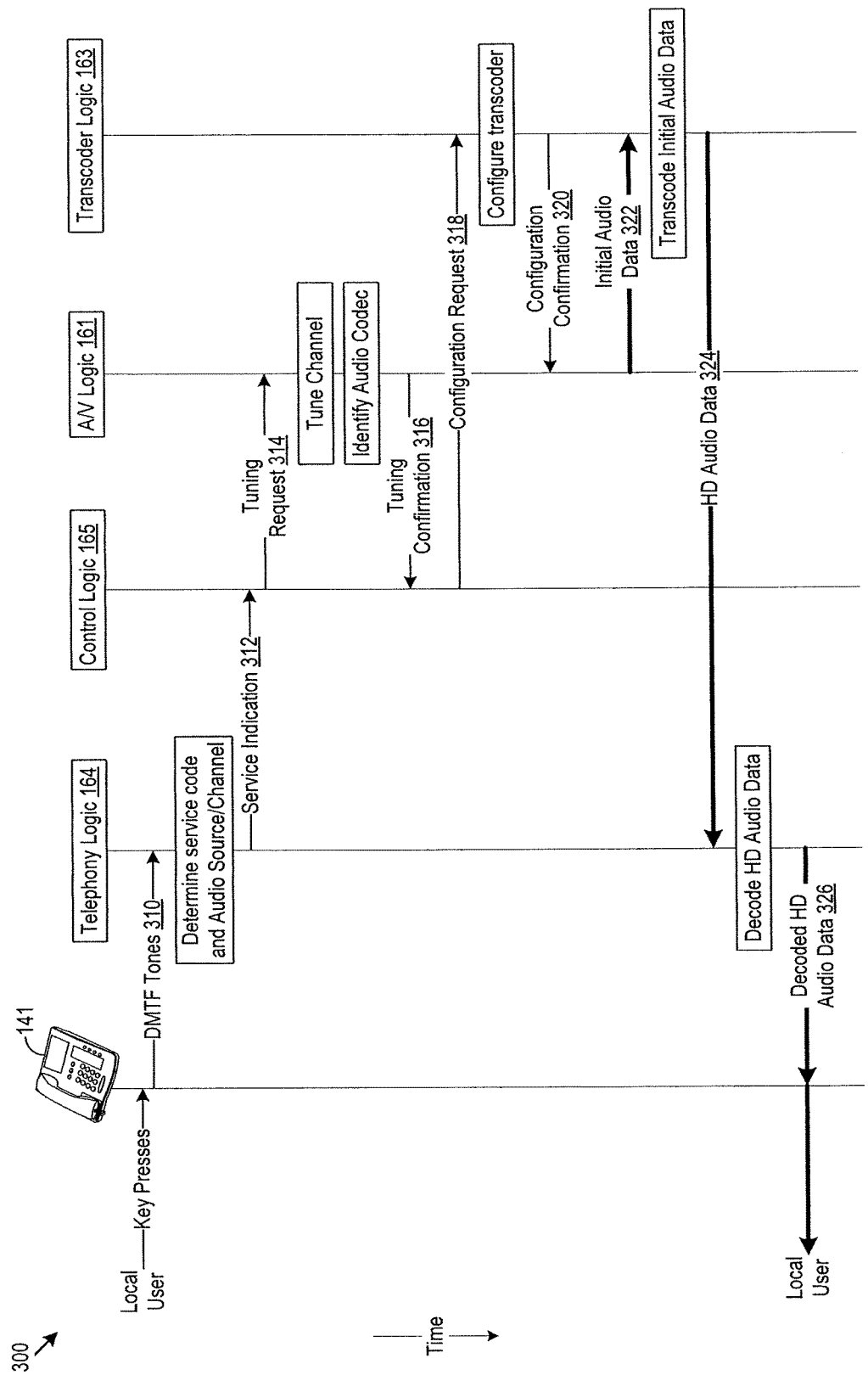
FIG. 3 shows a timing example for initiating distribution of HD audio.

FIG. 3 shows a timing example 300 for initiating distribution of HD audio. The timing example 300 may illustrate how a local user initiates distribution of HD voice to a telephony device operated by the local user, e.g., the phone 141 seen in FIG. 3. As one example, the local user may initiate distribution of HD audio from a phone in a home telephone network. The timing example 300 in FIG. 3 depicts the interaction, e.g., signal exchange, between a phone 141 and distribution logic 160 implemented in an exemplary HD distribution device or system that includes the telephony logic 164, control logic 165, A/V logic 161, and transcoder logic 163. The phone 141 and distribution logic elements may interact via internal or external signal exchanges depending whether the elements are implemented within the same device or separate devices.

The local user may start an HD audio distribution process by sending an HD audio service request to the HD audio distribution system. In one example, the local user may send an audio service request through the phone 141 by taking the phone 141 off-hook and entering key presses. In doing so, the local user may send a control signal or service request to control the distribution of HD audio to a local communication device. The phone 141 may identify the key presses of the local user and send corresponding DMTF tones 310 to the telephony logic 164. The telephony logic 164 may determine whether the received DMTF tones 310 correspond to a telephone call initiation, e.g., an outgoing phone call, or to an HD audio service request, e.g., an HD audio distribution request or signal. The telephony logic 164 may identify a HD audio service request from the DMTF tones 310 by identifying a predetermined ordering of the DMTF tones 310. In one example, the telephony logic 164 may identify a HD audio service request or signal when the first DMTF tone corresponds to a particular key, e.g., the pound ("#") key or the star ("*") key.

The telephony logic 164 may respond to the DMTF tones 310 depending on whether the DMTF tones 310 indicate a call initiation or an HD audio service request. When the DMTF tones 310 correspond to an outgoing telephone call, the telephony logic 164 may initiate the telephone call, e.g., by initiating a call procedure through a VoIP client implemented by the telephony logic 164. When the DMTF tones 310 indicate an HD audio service request or signal, the telephony logic 164 may identify a particular HD audio service specified by the service request, e.g., through the DMTF tones 310. For instance, the distribution logic 160 may identify a specified service by reading a predetermined portion of the service request string corresponding to the DMTF tones 310. In one example, the distribution logic 160 may access a database or memory storing entries associating predetermined DTMF tone strings with HD audio services. In this example, the telephony logic 164 may access the database to identify a particular HD audio service associated with the DMTF tones 310 (or a selected portion of the DMTF tones 310). When the DMTF tones 310 fail to specify a particular service, e.g., when no entries in the database correspond to the DMTF tone string, the telephony logic 164 may transmit an error indication to the phone 141. The error indication may take any form, such as a pre-recorded error message or sound.

In addition to identifying an HD service, the telephony logic 164 may also extract audio source information from the DMTF tones 310. For example, a portion of the DMTF tones 310 may include an audio selection identifying an audio source to obtain audio data from. As one example, an audio selection portion of the DMTF tones 310 may specify a table or database key that the telephony logic 164 may use to perform a lookup operation in a database mapping audio sources. As another example, a portion of the DMTF tones 310 may specify a channel number to obtain audio data from, e.g., a broadcast A/V channel received by a distribution device 110, such as a gateway device, set-top box, or other electronic device.

Upon analyzing the DMTF tones 310, the telephony logic 164 may generate a service indication message 312 according to the received DMTF tones 310. The service indication message 312 may identify a service selected by the local user and may further include any additional information associated with a selected service, e.g., an audio source associated with the selected service. The telephony logic 164 may then send the service indication message 312 to the control logic 165. In response to receiving the service indication message 312, the control logic 165 may configure any number of elements of the distribution logic 160 to perform the HD audio service specified by the service indication message 312.

In FIG. 3, the service indication message 312 specifies an HD audio distribution request and includes a broadcast channel as the audio source associated with the distribution request. As such, the control logic 165 may send a tuning request 314 to the A/V Logic 161, which may include the channel number specified by the local user's HD audio service request. In response to receiving the tuning request 314, the A/V logic 161 may configure one or communication resources, e.g., the communication interface 150, in order to receive audio data from the specified broadcast channel.

As another example, the A/V logic 161 may receive a tuning request 314 specifying an IP based audio source, e.g., an audio streaming website accessible via the Internet. The A/V logic 161 may then instruct additional communication logic, e.g., the broadband logic 162, to obtain audio data from the specified IP based audio source. In one example, the A/V logic 161 may include a streaming client configured to obtain audio data from various audio sources, e.g., a streaming application designed to execute on a set-top box or gateway device. The A/V logic 161 may invoke the streaming client to obtain the specified audio data. The streaming client may interact with the communication interface 150 or other communication logic (e.g., the broadband logic 162) to obtain audio data from the specified audio source, e.g., by invoking a streaming protocol through the broadband logic 162.

Beyond obtaining audio data from a specified audio source, the A/V logic 161 may also identify additional information associated with a specified audio source or the received audio data, such as an associated audio codec. To identify an audio codec, the A/V logic 161 may, or example, inspect received audio data to determine an audio codec. Or, the A/V logic 161 may receive a signal, message, or indication from the audio source identifying the associated audio codec. The A/V logic 161 may also send a tuning confirmation 316 to the control logic 165, which may specify the identified audio codec.

The control logic 160 may configure the transcoder logic 163 according to an identified audio codec. As seen in FIG. 3, the control logic 165 sends a configuration request 318 to the transcoder logic 163, which may include an initial audio code, a final audio codec, or both. The initial audio codec may specify the audio codec associated with received A/V or audio data. The final audio code may specify the audio codec the transcoder logic 163 will transcode the received A/V or audio data into, e.g., an HD audio codec. The transcoder logic 163 may then configure any transcoding logic, circuitry, or device in order to transcode received audio data from the initial audio codec to the final audio codec. The transcoder logic 163 may then send a configuration confirmation 320 to the A/V logic 161. Optionally, the transcoder logic 163 may send the configuration confirmation 320 to the control logic 165 as well.

Upon receiving a configuration confirmation 320 from the transcoder logic 163, the A/V logic 161 may begin sending received audio data to the transcoder logic 163. In the timing example 300 in FIG. 3, the A/V logic 161 sends the received audio data as the initial audio data 322, whereupon the transcoder logic 163 may transcode the initial audio data 322 into transcoded audio data. In one example, the A/V logic 161 may receive audio data encoded according to a super wideband audio codec, such as AAC or AC-3. The transcoder logic 163 may transcode the received AAC or AC-3 audio data into a HD audio code, such as G.722. The transcoder logic 163 may send the transcoded audio data to the telephony logic 164, seen in FIG. 3 as the HD audio data 324.

As mentioned above, the telephony logic 164 may decode or encode audio data into a communication format supported by a network, such as analog telephony network or IP network. In FIG. 3, a distribution device 110 implementing the telephony logic 164 interfaces with an analog telephone network and the telephony logic 164 may decode the received HD audio data 324 to support communication over the analog telephone network. For example, the telephony logic 164 may decode the HD audio data 324 for communication across an RJ-11 analog telephone network. The telephony logic 164 may then transmit the decoded HD audio data 326 to the phone 141 for playback. When the telephony logic 164 interfaces with an IP network, the telephony logic 164 may encode the HD audio data 324 for communication across the IP network as well.

In one example, the telephony logic 164 may transmit the encoded or decoded HD audio data to any number of devices communicatively linked to a distribution device via a local telephone network. A distribution device 110 or the telephony logic 164 may send HD audio data to any electronic device connected to a local network such as a home telephone network (e.g. to a speaker phone, a cordless handset, earphone, or audio player connected through the home telephone network). In a telephone network, the telephony logic 164 may send encoded or decoded HD audio data to any phone device that is active or off-hook.

While the example in FIG. 3 depicts initiating distribution of an HD audio stream, the distribution logic 160 may also support additional HD distribution service requests as well. The local user may send an HD distribution service request while the phone 141 plays back an HD audio stream. For example, the telephone logic 164 may identify a service code from DMTF tones 310 sent from the phone 141 corresponding to an audio source change request (e.g., a channel change) or a scan audio source service (e.g., a scan channel request). In response to receiving a change channel service request, the control logic 165 may send a tuning request 314 to the A/V logic 161 indicative of the requested channel change or audio source change. Then the A/V logic 161, transcoder logic 163, and telephony logic 164 may process audio data received from the new audio source in a similar manner as discussed above.

With respect to an audio source scan request, the control logic 165 may coordinate with the A/V logic 161 to obtain audio data from an audio source for a predetermined scan time and then obtaining audio data from a next audio source. The control logic 165 may send a tuning request 314 after the predetermined scan time has elapsed instructing the A/V logic 161 to proceed to obtain audio data from a next audio source. In servicing the scan request, the distribution logic 160 may continue to obtain, process, and distribute audio data from various audio sources until a stop indication is received from the local user, e.g., via a service code entered by the local user and sent as DMTF tones 310. Then, the control logic 165 may forego sending a tuning request 314 upon expiration of the predetermined scan time.

Figure 4:
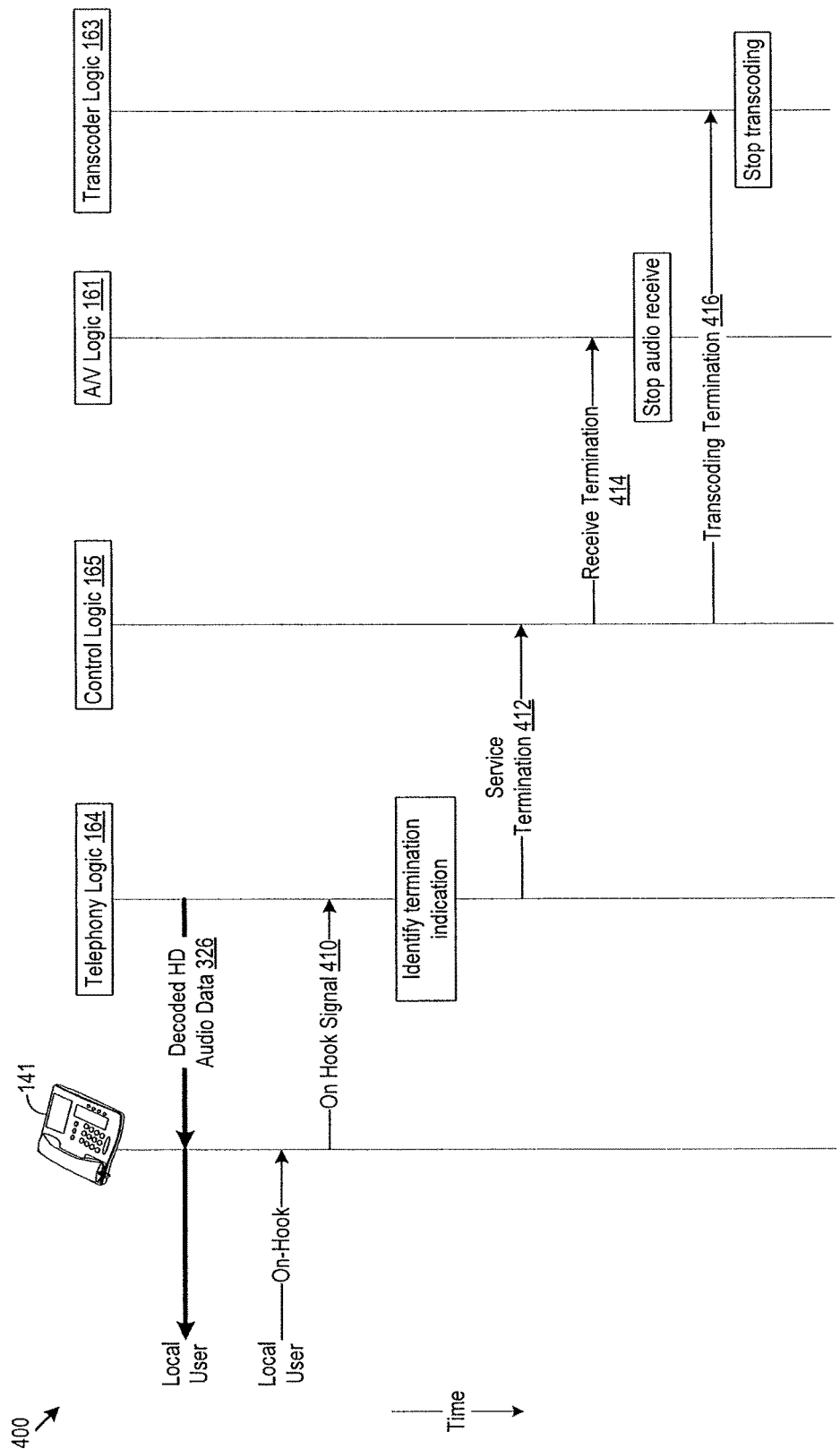
FIG. 4 shows a timing example for terminating distribution of HD audio.

FIG. 4 shows a timing example 400 for terminating distribution of HD audio. The timing example 400 in FIG. 4 includes a phone 141 and distribution logic 160 that includes telephony logic 164, control logic 165, A/V logic 161, and transcoder logic 163. The distribution logic 160, such as the telephony logic 164, control logic 165, A/V logic 161, and transcoder logic 163, may obtain, process, and distribute audio data as an HD audio data stream as discussed above in FIG. 3. And as seen in FIG. 4, the telephony logic 164 may send decoded HD audio data 326 to the phone 141 for playback. A distribution device 110 or distribution logic 160 may terminate distribution of HD audio upon receiving a termination indication. For example, the local user may send a termination indication to a distribution device 110 through the phone 141. In one example, the local user may generate or send a termination indication by hanging up the phone 141, placing a receiver of the phone 141 in an on-hook position, which may send a termination signal to the telephony logic 164. Alternatively, the distribution device 110 may identify a termination indication as a predetermined string of key presses and corresponding DMTF tones sent from the phone 141.

The telephony logic 164 may identify when the phone 141 enters an on-hook state, e.g., when the local user hangs up the phone 141. In FIG. 4, the phone 141 sends an on hook signal 410 to the telephony logic 164 when the phone 141 identifies an on-hook state. By receiving the on hook signal 410, the telephony logic 164 may identify a termination indication. Then, the telephony logic 164 may send a service termination message 412 to the control logic 165, which may indicate that the telephony logic 164 has identified or received a service termination indication.

Upon receiving a service termination message 412, the control logic 165 may stop particular portions of the distribution logic 160 from obtaining, transcoding, processing, or transmitting audio data. For example, the control logic 165 may instruct any combination of the A/V logic 161, transcoder logic 163, or telephony logic 164 to cease distribution of an HD audio stream. With respect to the A/V logic 161, the control logic 165 may send a receive termination message 141 to the A/V logic 161 instructing the A/V logic 161 to stop obtaining audio data. In response, the A/V logic 161 may configure one or more communication resource to cease receiving audio data, e.g., from a specified audio source or other audio source. When the A/V logic 161 obtains audio data through a streaming client, the A/V logic 161 may instruct the streaming client to cease receiving data, for example, by stopping execution of the streaming client or application. Similarly, when the A/V logic 161 obtains audio data through additional communication logic, e.g., the broadband logic 162, the A/V logic 161 may instruct the additional communication logic to cease receiving audio data.

Additionally or alternatively, the control logic 165 may send a transcoding termination message 416 to the transcoder logic 163, which may instruct the transcoder logic 163 to stop transcoding audio data to an HD audio codec for playback by the phone 141. In one example, the control logic 165 may also send a distribution termination instruction to the telephony logic 164 to cease sending decoded HD audio data 326 across a local network, e.g., to the phone 141.

As discussed above, a distribution device 110 may distribute an HD audio stream to any number of electronic devices, e.g., phones, connected via one or more networks such as a local telephony network. When multiple phones in one or more networks are playing back an HD audio stream, e.g. in an off-hook state, the telephony logic 164 may not identify a termination indication when an on-hook signal 410 is received from a first electronic device when other electronic devices are in an off-hook state. In one example, the telephony logic 164 may identify a termination indication when an on-hook signal 410 is received from a last electronic device previously in an off-hook state (e.g., the only off-hook electronic device sends an on-hook signal 410). In other words, the telephony logic 164 may not identify a termination indication when the telephony logic 164 receives an on hook signal 410 while at least one other electronic device is in an off-hook state or playing back HD audio.

Figure 5:
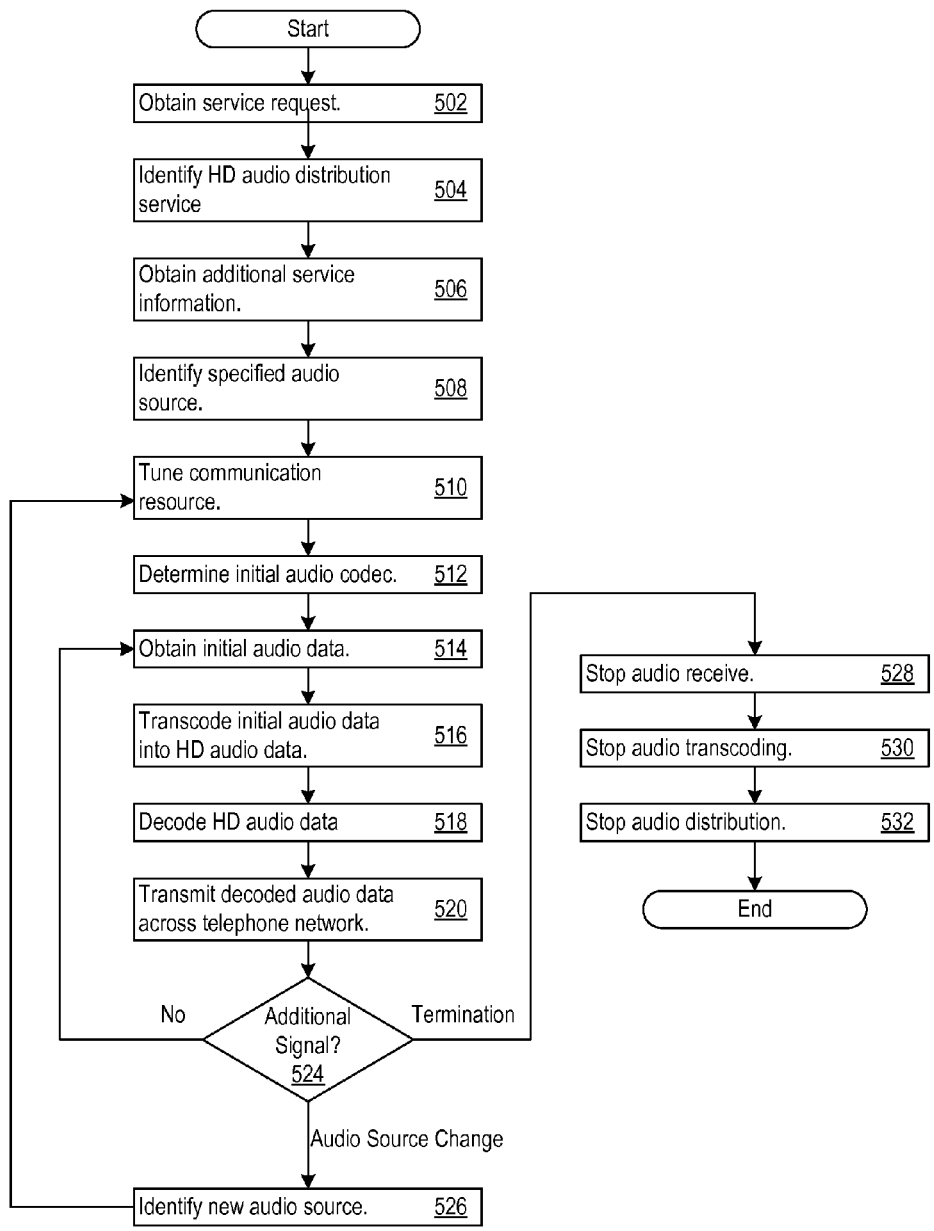
FIG. 5 shows an example of logic that may be implemented as hardware, software, or both.

FIG. 5 shows an example of logic 500 that may be implemented as hardware, software, or both. For example, distribution logic 160 may implement the logic 500, e.g., through any combination of the A/V logic 161, broadband logic 162, transcoder logic 163, telephony logic 164, or control logic 165 and across any number of devices.

The distribution logic 160 may obtain an HD audio service request (502) from a communication device, e.g., the phone 141. The communication device may be configured to playback HD audio data. The communication device may send the service request in any number of ways. For example, the distribution logic 160 may receive a service request in the form of DMTF tones sent by a communication device communicatively linked to the distribution logic 160. The distribution logic 160 may then identify when the service request corresponds to an HD audio distribution service (504), such as by identifying that a portion of the service request corresponds to a particular string of DMTF tones or particular signal. In one example, the distribution logic 160 may access a database or table to correlate the service request, e.g., DMTF tone string, with a distribution service.

The distribution logic 160 may obtain additional service information related to the HD audio service request (506), such as by extracting a portion of the service request. In particular, the distribution logic 160 may obtain an audio selection from the service request, through which the distribution logic 160 may identify a specified audio source (508). The distribution logic 160 may determine that a string of DMTF tones specify a broadcast audio or A/V channel as a specified audio source. Or, the distribution logic 160 may extract a portion of the service request as a table key to lookup an associated audio source, e.g., an IP-based audio source such as an audio streaming website or service.

Upon identifying the specified audio source, the distribution logic 160 may tune a communication resource according to the specified audio source (510). The distribution logic 160 may tune a communication interface or A/V receiver to receive data from a particular channel, e.g., a broadcast channel. Or, the distribution logic 160 may invoke a streaming client or application to obtain audio information from a specified audio source. The distribution logic 160 may also determine an initial audio codec associated with audio data received (or to be received) from the specified audio source (512). Then, the distribution logic 160 may obtain initial audio data from the specified audio source (514), e.g., via the tuned communication resource.

The distribution logic 160 may obtain initial audio data that is of a higher quality level than HD audio data, HD Voice data, or wideband audio data. The initial audio data may be higher in quality level according to any number of quality metrics, including frequency range, encoding format, compression format or rate, sampling rate, quantization error, data bit depth, or others. As one example, the distribution logic 160 may obtain initial audio data broadcasted from an A/V source and encoded according to a super wideband audio codec, such as AAC or AC-3.

The distribution logic 160 may transcode the initial audio data (516) to an audio format supported by the communication device, such as to an HD audio codec supported by the communication device (e.g., an HD Voice codec such as G.722). The distribution logic 160 may transcode the initial audio data into a lower quality level, such as when the initial audio data is of a higher quality level (e.g., super wideband codec) than an HD audio quality level (e.g., HD Voice). Then, the distribution logic 160 may distribute the transcoded audio data, e.g., HD audio data, across a communication network to the communication device for playback. In one example, the distribution logic 160 may decode the transcoded HD audio data for communication across the communication network (518), such as a local analog telephony network. When the distribution logic 160 communicates with the communication device across an analog telephony network, the distribution logic 160 may decode the HD audio data for communication across an analog communication interface to the analog telephony network (e.g., for communication across an RJ jack). As another example, when the distribution logic 160 communications with the communication device across an IP network, the distribution logic 160 may encode the HD audio data into packet format for transmission via the IP network. After decoding or encoding, the distribution logic 160 may transmit the HD audio data across the communication network to the communication device (520).

The distribution logic 160 may continue to obtain, process, and distribute audio data from the specified audio source to the communication device (514-520) until receiving an additional service request (524). In one example, the distribution logic 160 may receive a service request specifying an audio selection change, e.g., an audio source change. The audio selection change may specify a new audio source to replace the specified audio source previously received by the distribution logic 160. The distribution logic 160 may identify the new audio source (526), tune a communication resource to receive audio data from the new audio source, determine an initial codec associated with audio data from the new audio source, and obtain, process, and distribute audio data from the new audio source (508-520) instead of the previously specified audio source.

In another example, the distribution logic 160 may identify a termination indication as the additional service request, including any of the termination indications or identification methods discussed above in FIG. 4. In response, the distribution logic may stop receiving audio data from an audio source (528), stop transcoding obtained audio data (530), stop distributing transcoded audio data (532), or any combination thereof.

Figure 6:
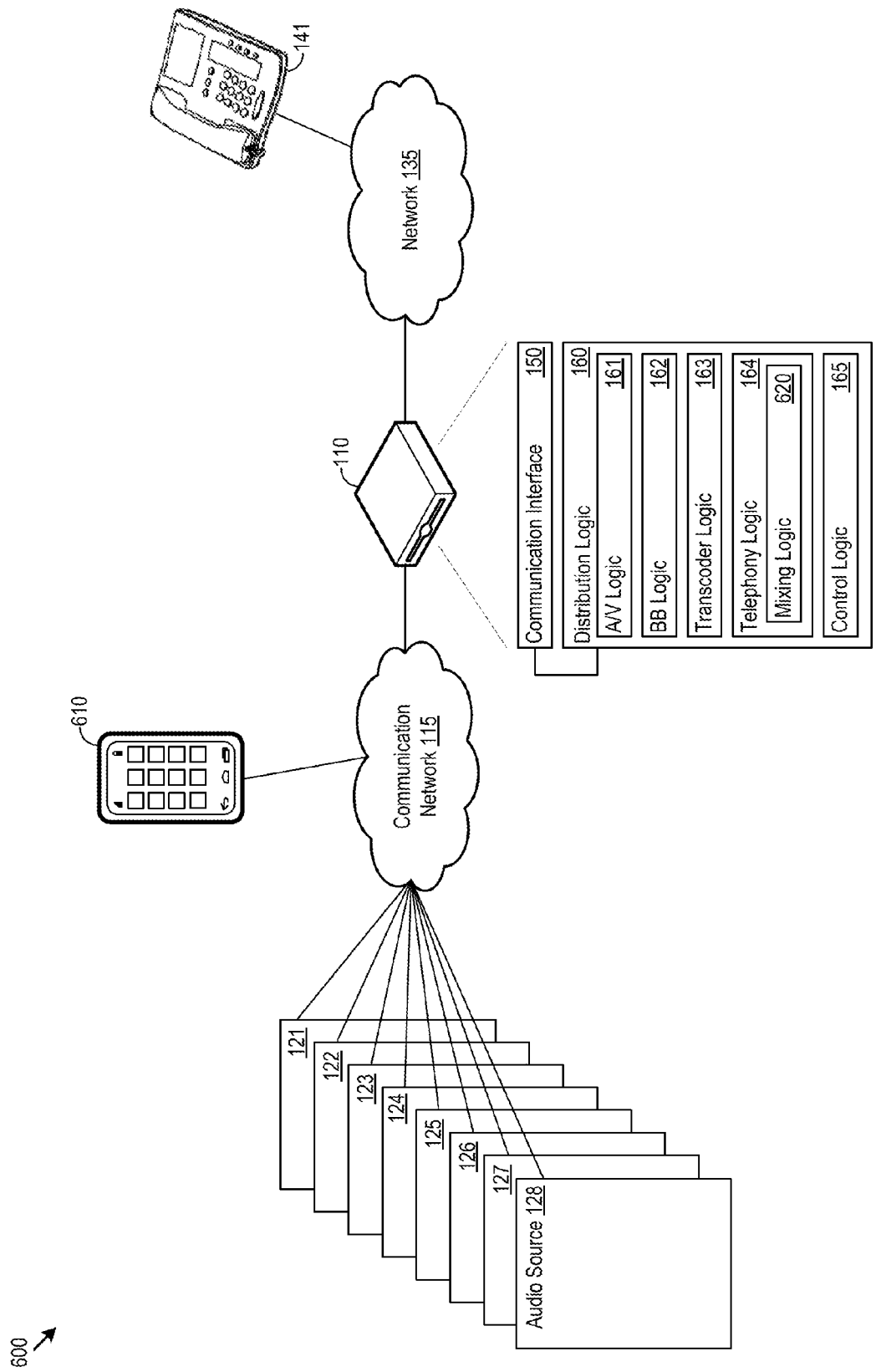
FIG. 6 shows an example of a system for communicating HD audio to a remote communication device.

FIG. 6 shows an example of a system 600 for forwarding HD audio to a remote communication device 610. The exemplary system 600 or any portion thereof may share any number of common characteristics with respect to FIG. 1 above, including with respect to the distribution device 110, communication network 115, audio sources 121-128, network 135, and the phone 141. The distribution device 110 may include a communication interface 150 and distribution logic 160. The distribution logic 160 may include A/V logic 161, broadband logic 162, transcoder logic 163, telephony logic 164, and control logic 165. In the example in FIG. 6, the telephony logic 164 also includes mixing logic 620. The mixing logic 620 may combine multiple audio streams into a mixed audio stream.

In FIG. 6, the system 600 also includes a remote communication device 610. The remote communication device 610 may be any electronic or communication device communicatively linked to the distribution device 110, e.g., via the communication network 115. For example, the remote communication device may be a cellular telephone, portable music player, VoIP phone, stereo, remote telephone, or other device. The remote communication device 610 may also support playback of HD audio data. As described in greater detail below, the distribution logic 160 may obtain audio data from a specified audio source and distribute audio data to the remote communication device 610 as HD audio data.

Figure 7:
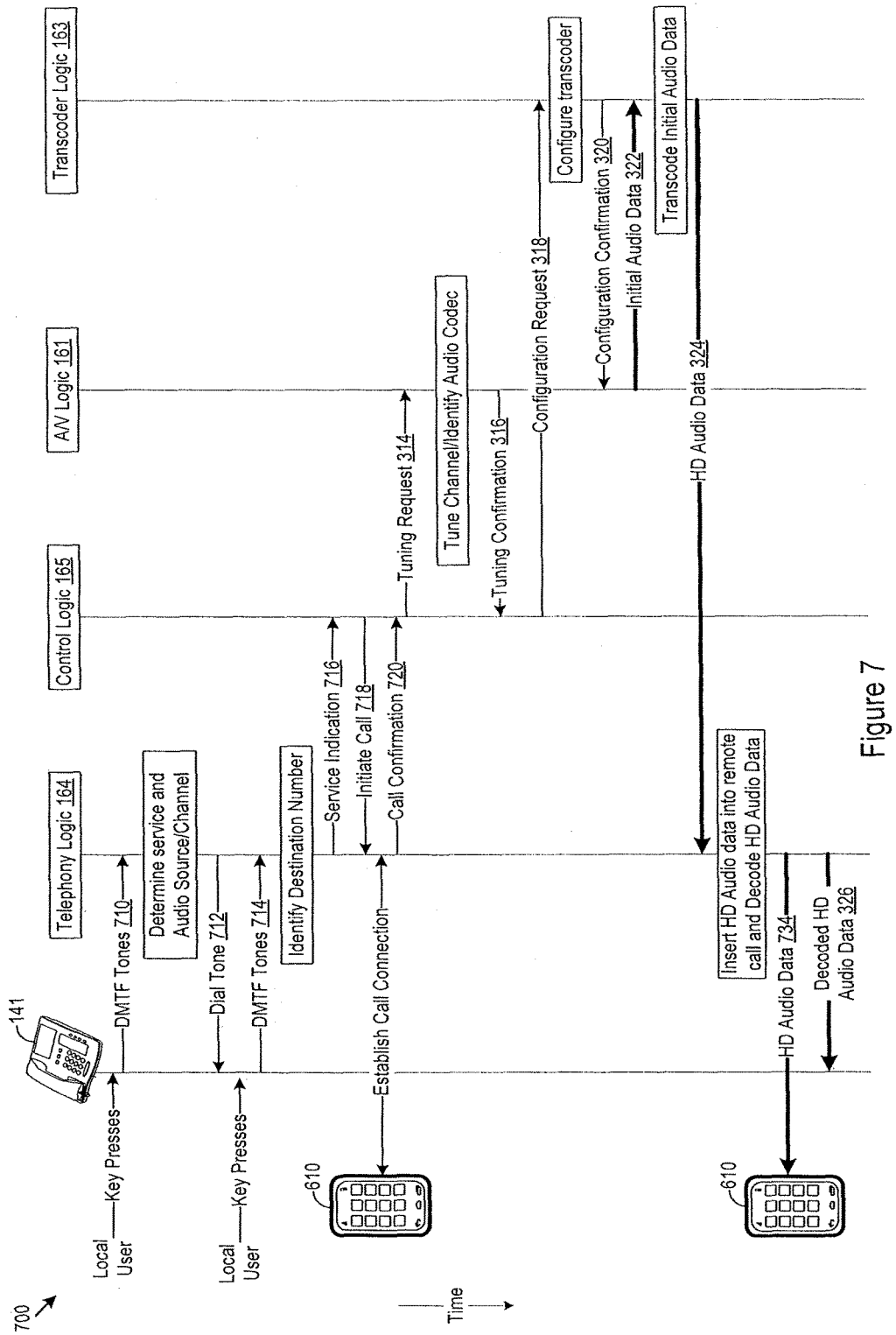
FIG. 7 shows a timing example of forwarding HD audio to a remote communication device.

FIG. 7 shows a timing example 700 of forwarding HD audio to a remote communication device 610. The timing example 700 includes a phone 141 communicatively coupled to distribution logic 160, such as through a local network. The distribution logic 160 in the timing example 700 includes telephony logic 164, control logic 165, A/V logic 161, and transcoder logic 163. The distribution logic 160 may initiate an HD audio forwarding process to the remote communication device 610 upon receiving an initiation indication, e.g., through an HD audio service request. As one example, the local user may press a predetermined combination of keys on the phone 141 specifying an audio forwarding service to the remote communication device 610 (e.g., the "#" key followed by a particular service code). The phone 141 may then send DMTF tones 710 corresponding with the key presses to the telephony logic 164, whereupon the telephony logic 164 may determine a service code associated with the DMTF tones 710. The telephony logic 164 may also identify a specified audio source from a selected portion of the DTMF tones 710, e.g., as an audio selection from a predetermined portion of the DMTF tones 710.

The telephony logic 164 may determine that the HD audio service indicated in a service request, e.g., DMTF tones 710, corresponds to a forwarding service to a remote communication device. In response, the telephony logic 164 may identify the remote destination device. The telephony logic 164 may send a destination device identification request to the local user. In one example seen in FIG. 7, the telephony logic 164 sends a dial tone signal 712 to the phone 141, which may prompt the local user to input identifying information associated with the remote communication device 610, such as the phone number of the remote communication device 610. The local user may enter key presses to the phone 141 which may be sent to the telephony logic 164 as DMTF tones 714. The telephony logic 164 may then identify the remote communication device 610 through the DMTF tones 714, e.g., by identifying the phone number of the remote communication device 610. In other examples, the telephony logic 164 may identify a remote communication device in other ways, such as sending a prerecorded prompt to the phone 141 requesting the destination phone number or identifying information from the local user.

The telephony logic 164 may generate and send a service indication message 716 to the control logic 165, which may specify an audio distribution request to the remote communication device 610, a specified audio source, and identification information of the remote communication device 610. In response, the control logic 165 may send an initiate call instruction 718 to the telephony logic 164. The telephony logic 164 may then attempt to establish a call connection with the remote communication device 610. The telephony logic 164 may attempt to establish the call connection through a communication format or protocol supported by the telephony logic 164. The telephony logic 164 may also utilize any supported communication network to establish the call connection with the remote communication device 610. Additionally, the telephony logic 164 may utilize other communication logic, e.g., the broadband logic 162, to establish the call connection as well. For example, the telephony logic 164 may utilize a VoIP protocol to establish a connection with the remote communication device 610 using any network supporting VoIP communication, including as examples, a wireless IP network, cable network, PSTN network, or others. Upon establishing a call connection with the remote communication device 610, the telephony logic 164 may send a call confirmation indication 620 to the control logic 165.

The control logic 165, A/V logic 161, and transcoder logic 163 may then obtain initial audio data 322 from the specified audio source and transcode the initial audio data 322 into HD audio data 324, as described above. For example, the control logic 165, A/V logic 161, and transcoder logic 163 may exchange messaging such as a tuning request 314, tuning confirmation 316, configuration request 318, and configuration confirmation 320 in a similar fashion as described above. The transcoder logic 163 may send a transcoded audio data, e.g., the HD audio data 324, to the telephony logic 164.

The telephony logic 164 may encode or decode the transcoded audio data for transmission to the remote communication device 610, the phone 141, or both. The telephony logic 164 may transmit the HD audio data 732 to the remote communication device 610 according to any communication protocol or format supported by the telephony logic 164, the remote communication device 610, or both. For example, the telephony logic 164 may encode and transmit the HD audio data 732 to the remote communication device 610 as VoIP HD audio data packets 734 across a communication network supporting VoIP communications. In doing so, the telephony logic 164 may use communication resources, such as a communication interface 150 or broadband logic 162, to interface with the IP network. In one example, the telephony logic 164 may also decode and transmit the decoded HD audio data 736 across a local network, e.g., an analog telephony network, communicatively linking the phone 141.

Figure 8:
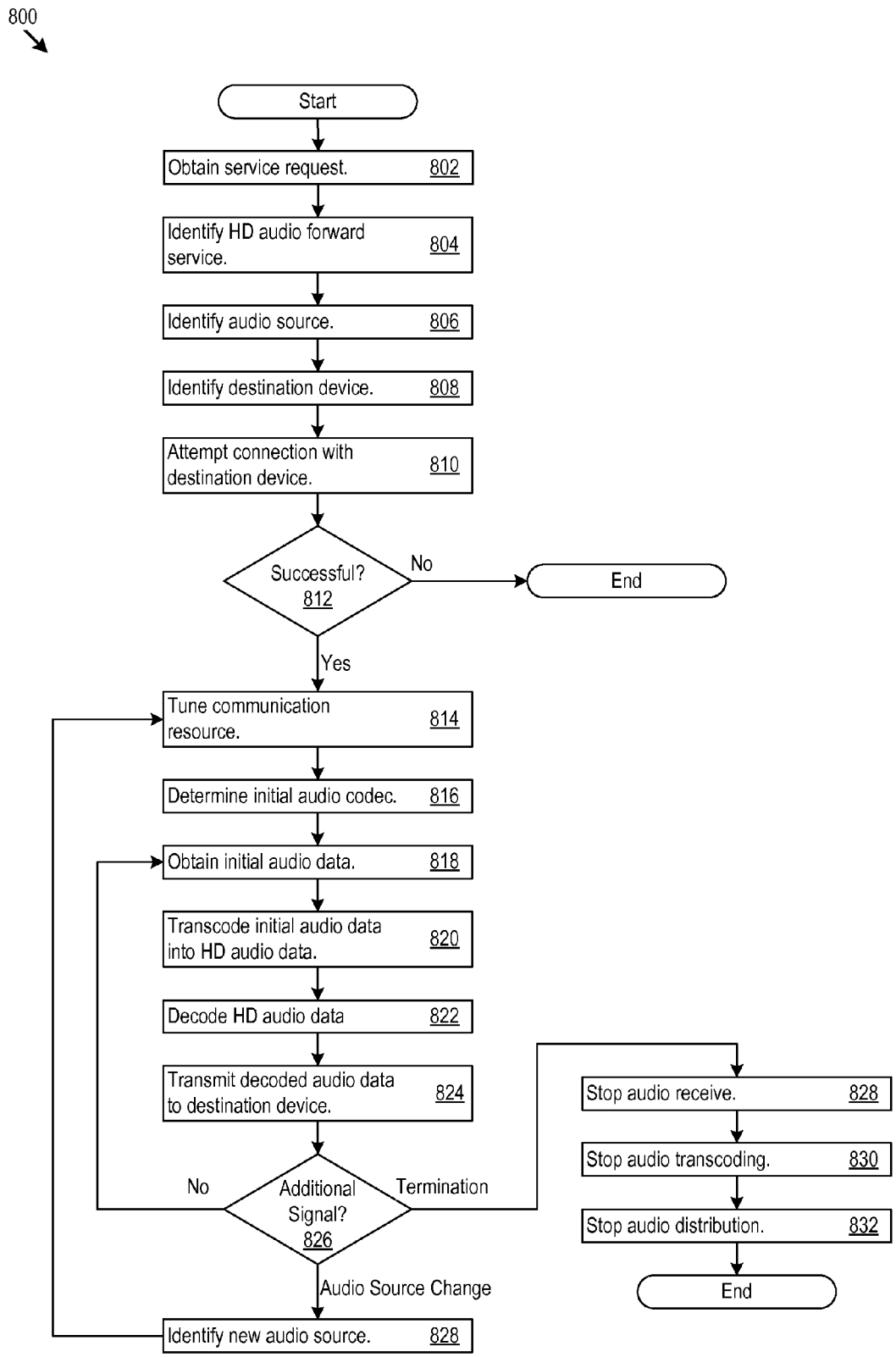
FIG. 8 shows an example of logic that may be implemented as hardware, software, or both.

FIG. 8 shows an example of logic that may be implemented as hardware, software, or both. For example, distribution logic 160 may implement the logic 800, e.g., through any combination of the A/V logic 161, broadband logic 162, transcoder logic 163, telephony logic 164, or control logic 165 and across any number of devices.

The distribution logic 160 may obtain a service request (802) from a communication device, e.g., the phone 141. The distribution logic 160 may obtain an HD audio service request in any of the ways described above. The distribution logic 160 may then examine the service request and determine a service associated with the service request. The distribution logic 160 may identify that a received audio service request specifies an HD audio forwarding service (804), for example by identifying a predetermined string of DMTF tones received from the phone 141. The distribution logic 160 may also identify an audio source specified in the HD audio forwarding request (806).

The distribution logic 160 may identify a destination communication device (808) associated with HD audio forwarding service request. The distribution logic 160 may identify the destination communication device in any number of ways. In one example, the distribution logic 160 may identify the destination communication device by obtaining a phone number associated with the destination device. For example, the distribution logic 160 may transmit a dial-tone signal to the phone 141 to receive a phone number of the destination device from the local user. Alternatively, the service request may include identifying information of the destination communication device (e.g., the phone number of the destination device or other identifying information). In this example, the distribution logic 160 may identify the destination communication device by extracting identifying information from a portion of the service request, e.g., a selected portion of a DMTF tone string sent from the phone 141.

The distribution logic 160 may attempt to establish a connection with the destination communication device (810). When the destination communication device is a phone device, the distribution logic 160 may initiate a call with the remote device using the obtained phone number. For example, the distribution logic 160 may include telephony logic 164 that may provide telephony functionality, including performing telephone calls via supported communication protocols and interfaces. When the distribution logic 160 fails to establish a call connection with the destination communication device (812), the distribution logic 160 may forego performing any additional actions to handle the HD audio forwarding service. The distribution logic 160 may also send a failed connection indication to the phone 141.

When the distribution logic 160 successfully establishes a connection with the destination communication device (812), the distribution logic 160 may tune a communication resource according to the specified audio source (814), determine an initial codec (814), obtain initial audio data from the specified audio source (816), and transcode the initial audio data to HD audio data (820) in any of the ways described above. Then, the distribution logic 160 may distribute the HD audio data to the communication device originating the service request, forward the HD audio data to the destination communication device, or both. To do so, the distribution logic 160 may encode or decode the HD audio data for transmission across a communication interface or protocol supported by the destination communication device (822), e.g., the protocol used to establish the call connection with the remote communication device. Then, the distribution logic 160 may transmit the encoded or decoded HD audio data to the remote communication device (824). In one example, the distribution logic 160 may transmit an HD audio data stream to the destination communication device using the call connection. The distribution logic 160 may also decode the HD audio data and send the decoded HD audio data to the communication device as well.

The distribution logic 160 may continue to forward the HD audio data to the remote communication device and/or distribute the HD audio data to the communication until receiving further control signaling (826). For example, the distribution logic 160 may receive an audio selection change, which may specify a new audio source. The distribution logic 160 may identify the new audio source (828), tune one or more communication resources to receive audio data from the new audio source, determine an initial code associated with audio data from the new audio source, and obtain, process, and forward audio data from the new audio source (814-824) to the destination device, originating device, or more.

The distribution logic 160 may also identify a service termination indication from additional signaling (826). In one example, the distribution logic 160 may identify a termination indication as an explicit signal (e.g., a predetermined DMTF tone string) sent from a communication device communicatively linked to the distribution logic 160. As another example, the distribution logic 160 may identify additional signaling from the originating communication device or destination communication device in the form of receiving an on-hook signal. In one example, the distribution logic 160 may identify a termination indication when receiving an on-hook signal from the destination communication device, e.g., a remote communication device 610. In this example, the distribution logic 160 may continue to obtain, process, and forward audio data to the destination communication device when the communication device sends an on-hook signal, e.g., hangs up. Alternatively, the distribution logic 160 may identify a termination indication when both the originating communication device and destination communication device send an on-hook signal. Upon obtaining a termination indication, the distribution logic 160 may cease audio data receiving activity (828), cease audio data transcoding activity (830), cease audio distribution and/or forwarding activity (832), or any combination thereof. As part of ceasing audio distribution and/or forwarding activity, the telephony logic 164 may also terminate the call connection with the destination communication device, e.g., the remote communication device 610.

Figure 9:
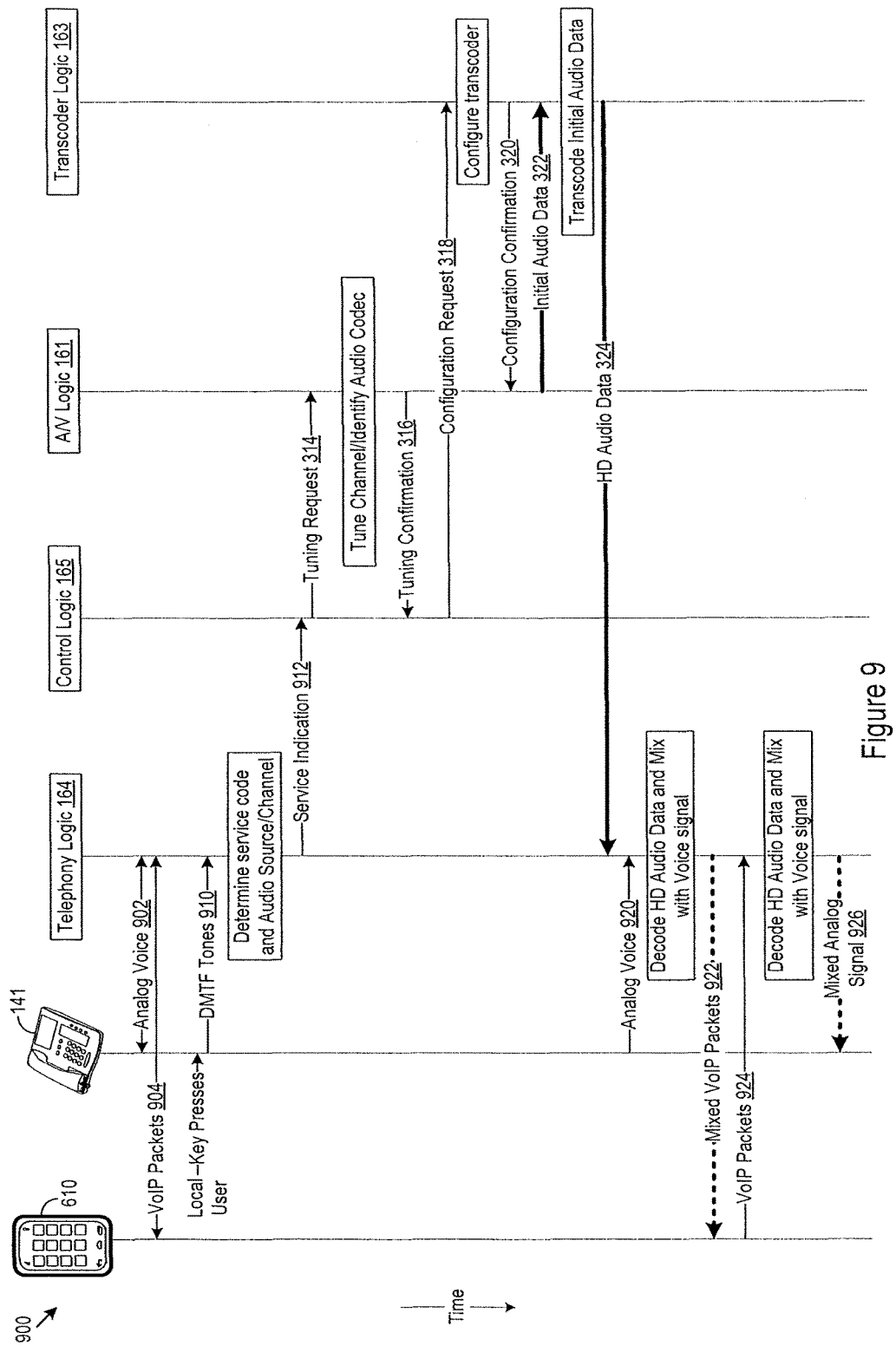
FIG. 9 shows a timing example of sharing HD audio during an active call connection.

FIG. 9 shows a timing example 900 of sharing HD audio during an active call connection. The timing example 900 includes a remote communication device 610, a phone 141, and distribution logic 160 that includes the telephony logic 164, control logic 165, A/V logic 161, and transcoder logic 163. The remote communication device 610, phone 141, and distribution logic 160 may communicate across any number of communication networks of any type, format, topology, or format. In the specific example in FIG. 9, the phone 141 communicates with the distribution logic 160 across an analog local telephone network, such as an RJ-11 analog telephone network. In FIG. 9, the remote communication device 610 communicates with the distribution logic 160 across any number of IP networks interconnecting a distribution device 110 implementing the distribution logic 160 with the remote communication device 610.

The timing example 900 may depict initiation of a real-time HD audio sharing service during an active call connection between the phone 141 and the remote communication device 610. As part of an active call connection, the phone 141 may send and receive a voice signal from the telephony logic 164 as an analog voice signal 902. The remote communication device 610 may send and receive a voice signal from the telephony logic 164 as VoIP packets 906. During the active call connection, a local user may initiate a real-time HD audio sharing service by sending a service request to the distribution logic 160. For example, a local user may enter key presses on the phone 141, which the phone 141 may send to the telephony logic 164 as DMTF tones 910. Alternatively, a remote user may send a HD audio service request to the distribution logic 160 as well, including by entering key presses through the remote communication device 610 for transmission to the telephony logic 164 as DMTF tones. The HD audio service request may specify a real-time HD audio sharing service and may include an audio selection specifying an audio source to obtain audio data from.

The telephony logic 164 may receive the DMTF tones 910 and determine a service code corresponding to the service request. The telephony logic 164 may also determine a specified audio source from the service request, e.g., specified by a particular portion of the DMTF tones 910. Then, the telephony logic 164 may generate and send a service indication message 912 to the control logic 615, which may specify real-time audio sharing request and include a specified audio source.

The control logic 165, A/V logic 161, and transcoder logic 163 may then obtain initial audio data 730 from the specified audio source and transcode the initial audio data 322 into HD audio data 324 similarly as described in FIG. 3 above. For example, the control logic 165, A/V logic 161, and transcoder logic 163 may exchange messaging such as a tuning request 314, tuning confirmation 316, configuration request 318, and configuration confirmation 320 in a similar fashion as described above. The transcoder logic 163 may send a transcoded audio data, e.g., the HD audio data 324, to the telephony logic 164.

In one example, the telephony logic 164 may include mixing logic 620 that may mix the HD audio data 324 with a voice signal. The telephony logic 164 may transmit a mixed signal to the phone 141, to the remote communication device 610, or to both. For example, during the active call connection, the telephony logic 164 may receive an analog voice signal 920 from the phone 141 for transmission to the remote communication device 610. The telephony logic 164 may mix the analog voice signal 920 with decoded HD audio data and re-encode the mixed signal for transmission to the remote communication device 610 as mixed VoIP packets 922.

During the active call connection, the telephony logic 164 may also receive a voice signal from the remote communication device 610 as VoIP packets 924 for transmission to the phone 141. The telephony logic 164 may decode the HD audio data 324 and VoIP packets 924 for transmission across an analog telephony network. The telephony logic 164 may also mix the decoded HD audio data with the decoded VoIP packets into a mixed analog signal 926 for transmission to the phone 141.

Thus, as described above, the distribution logic 160 may share, e.g., inject, the audio content of a specified audio source into an active call between the phone 141 and the remote communication device 610. The distribution logic 160 may continue to perform the real-time audio sharing service until the distribution logic 160 identifies a termination indication. For example, the distribution logic 160 may identify a termination indication when the telephony logic 164 receives an on-hook signal from the remote communication device 610, the phone 141, or both. Or the distribution logic 160 may identify a termination indication upon receiving a predetermined termination signal, e.g., via DMTF tones, the remote communication device 610, the phone 141, or both.

The distribution logic 160 may also receive and handle an audio source change request while performing the HD audio sharing service, e.g., via a DMTF tone signal sent by the remote communication device 610 or the phone 141. In response, the distribution logic 160 may obtain, process, and distribute audio data from a new audio source as specified by the audio change request.

Figure 10:
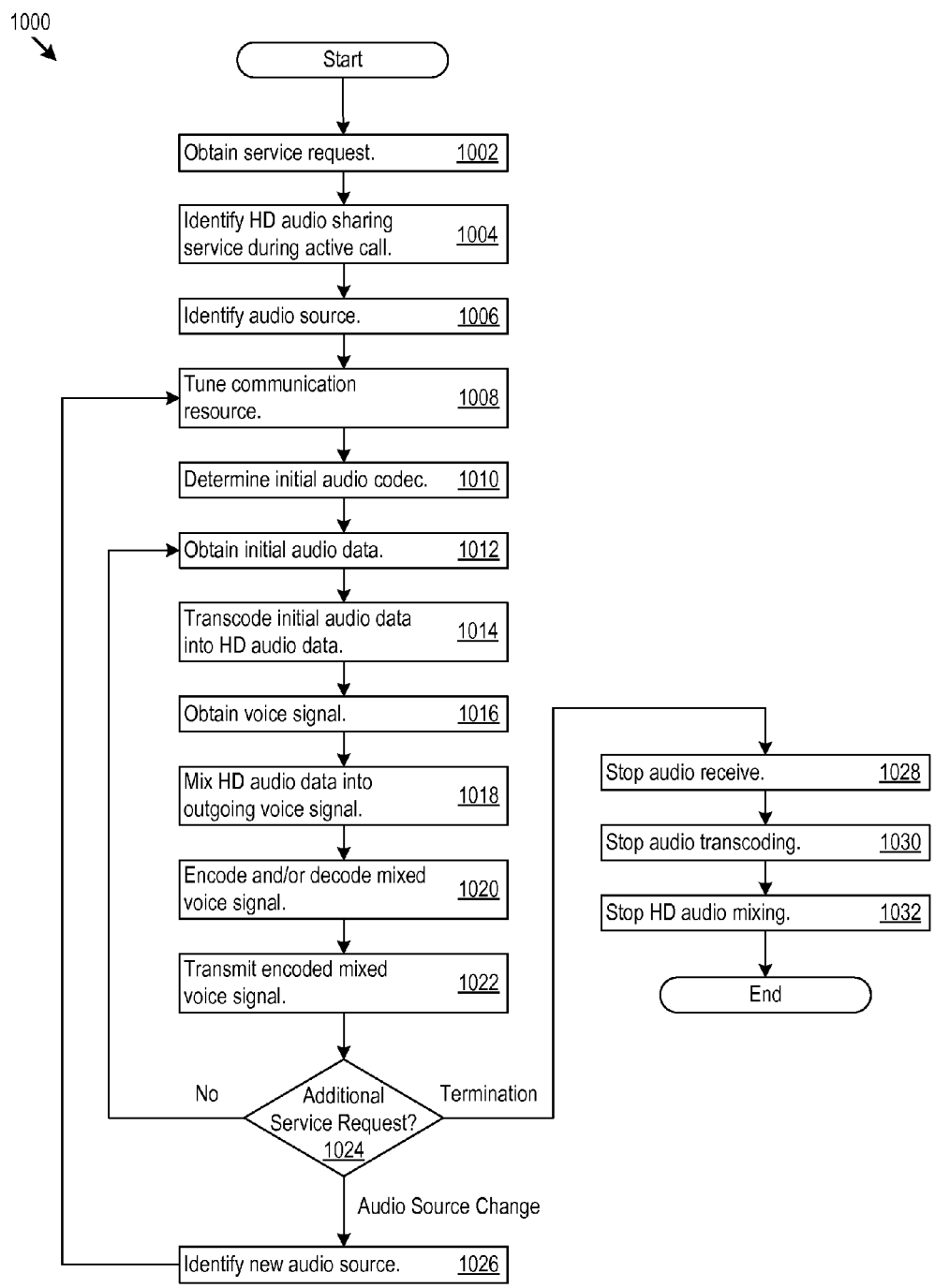
FIG. 10 shows an example of logic that may be implemented as hardware, software, or both.

FIG. 10 shows an example of logic 1000 that may be implemented as hardware, software, or both. For example, distribution logic 160 may implement the logic 1000, e.g., through any combination of the A/V logic 161, broadband logic 162, transcoder logic 163, telephony logic 164, or control logic 165 and across any number of devices.

The distribution logic 160 may obtain a service request (1002) during an active call connection. The distribution logic 160 may obtain the service request from any communication device participating in the active call connection, such as the phone 141 or the remote communication device 610. The service request may be obtained in any of the ways discussed above, e.g., as DMTF tones. The distribution logic 160 may examine the service request and determine a service associated with the service request. The distribution logic 160 may identify that the received audio service request specifies a HD audio sharing service during an active call connection (1004). In one example, the distribution logic 160 may identify that a selected portion of the DMTF tones includes a predetermined string of DMTF tone values corresponding to the HD audio sharing service. The service request may also include an audio selection, which distribution logic 160 may identify as a predetermined portion of the service request. The distribution logic 160 may identify an audio source specified in the service request (1006) according to the audio selection.

The distribution logic 160 may tune a communication resource according to the specified audio source (1008), determine an initial codec (1010), obtain initial audio data from the specified audio source (1012), and transcode the initial audio data to HD audio data (1014) in any of the ways described above. Then, the distribution logic 160 may share the HD audio content by mixing (e.g., injecting) the HD audio data into one or more voice signals transmitted as part of the active call connection. The distribution logic 160 may obtain an incoming voice signal from a first communication device in the active call connection (1016) and mix the HD audio data and the received incoming voice signal into an outgoing voice signal directed to second a communication device participating in the active call connection (1018). Then, the distribution logic 160 may encode and/or decode the mixed outgoing voice signal (1020) according to a communication network, type, protocol, medium, or other communication characteristic for communicating with the second communication device. Then, the distribution logic 160 may transmit the mixed outgoing voice signal to the second communication device (1022). The distribution logic 160 may also perform a similar HD audio sharing process for an incoming voice signal received from the second communication device to transmit a mixed outgoing voice signal to the first communication device as well (1016-1022). In this way, the distribution logic 160 may share an HD audio data stream from a specified audio source to any number of communication devices participating in the active call connection.

The distribution logic 160 may continue to mix the HD audio data into the active call connection until receiving further control signaling (1024). The distribution logic 160 may receive a service request specifying an audio selection change, e.g., an audio source change. The audio selection change may specify a new audio source to replace the specified audio source previously received by the distribution logic 160. The distribution logic 160 may identify the new audio source (1026), tune a communication resource to receive audio data from the new audio source, determine an initial code associated with audio data from the new audio source, and obtain, process, and share the audio data from the new audio source in the active call connection (1008-1022) instead of the previously specified audio source.

The distribution logic 160 may also identify a service termination indication from additional signaling received from a communication device (1024). In one example, the distribution logic 160 may identify a termination indication as an explicit signal (e.g., a predetermined DMTF tone string) received from any communication device participating in the active call connection. As another example, the distribution logic 160 may identify additional signaling a participating communication device in the form of receiving an on-hook signal. The distribution logic 160 may identify a termination indication when receiving an on-hook signal any number of devices participating in the active call connection. As examples, the distribution logic 160 may identify a termination indication when a predetermined number of communication devices participating in the active call connection send an on-hook signal or when the call connection ends. Upon obtaining a termination indication, the distribution logic 160 may cease audio data receiving activity (1028), cease audio data transcoding activity (1030), cease audio mixing and sharing activity (1032), or any combination thereof.

Figure 11:
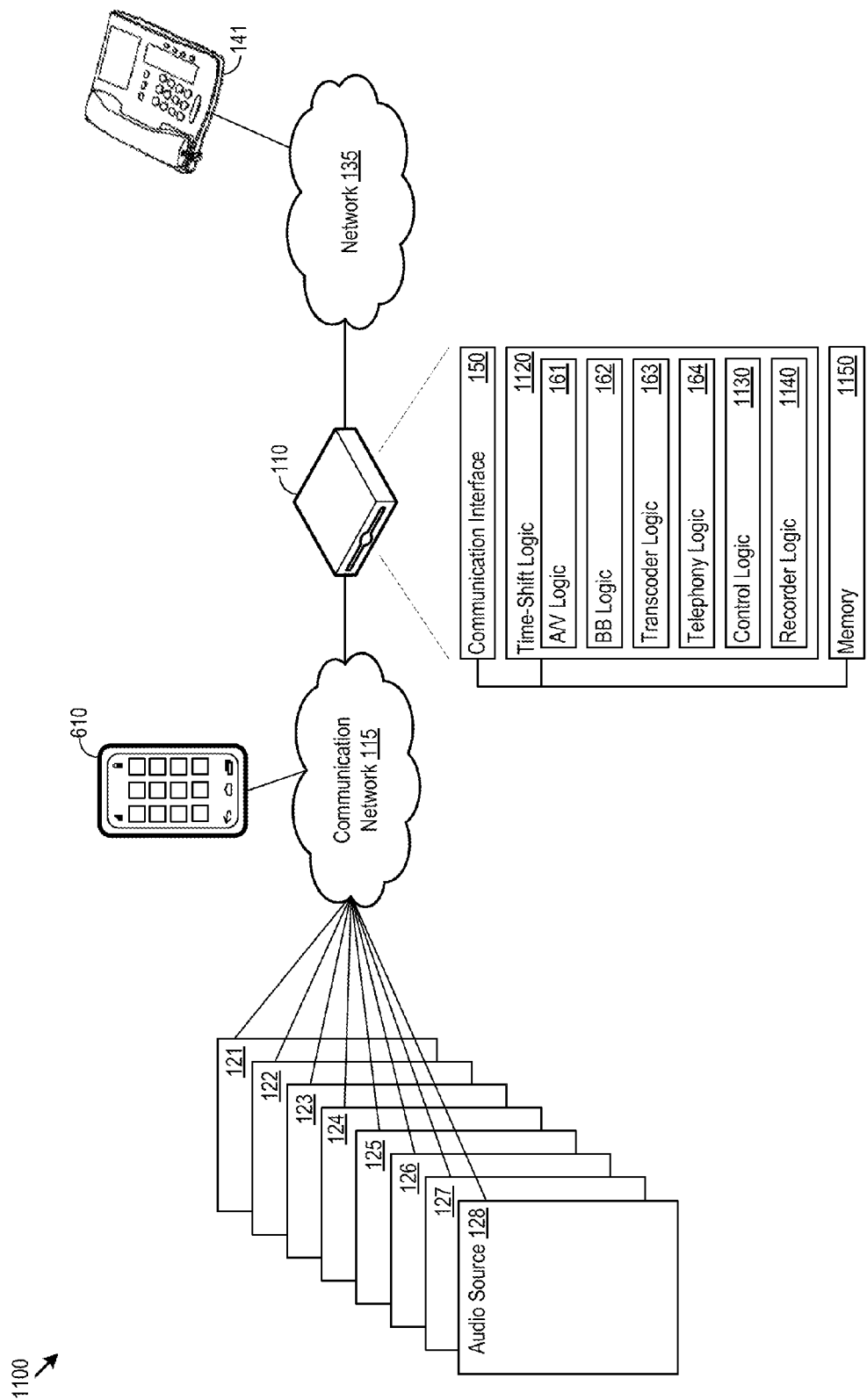
FIG. 11 shows an example of a system for time-shifting the distribution of HD audio.

FIG. 11 shows an example of a system 1100 for time-shifting the distribution of HD audio. Time-shifting the distribution of HD audio may refer to delaying the distribution of obtained HD audio data for any number of reasons and in any number of circumstances. The exemplary system 1100 or any portion thereof may share any number of common characteristics or elements with respect to FIGS. 1 and 6 above, including with respect to the distribution device 110, communication network 115, audio sources 121-128, network 135, phone 141, and remote communication device 610. In FIG. 11, the distribution device 110 includes a communication interface 150 and the time-shift logic 1120. The time-shift logic 1120 may include the A/V logic 161, broadband logic 162, transcoder logic 163, and telephony logic 164, as described above. The time-shift logic 1120 may also include the control logic 1130 and recorder logic 1140 for time-shifting the distribution of HD audio. As seen in FIG. 11, the distribution device 110 may also include a memory 1150, which may be used to store data, such as HD audio data. The recorder logic 1140 may interface with the memory 1150 to control recording and forwarding of audio data in the memory 1150.

In operation, the time-shift logic 1120 may time-shift the distribution of HD audio in multiple ways. As discussed below, the time-shift logic 1120 may initiate storage of HD audio into the memory 1150 in response to receiving a record indication and subsequently or concurrently forward stored HD audio data to any number of destination devices, such as the remote communication device 610 or the phone 141.

Figure 12:
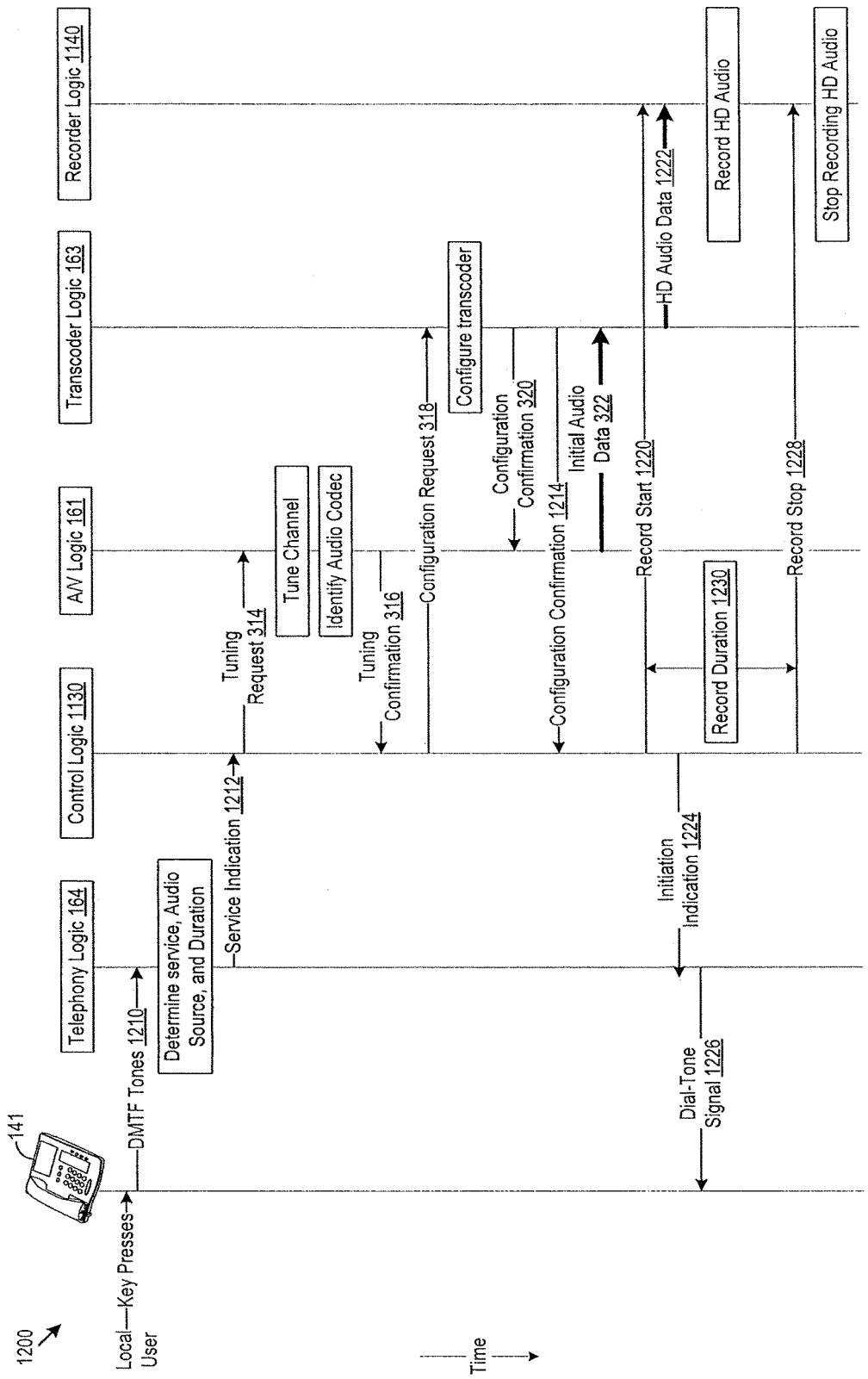
FIG. 12 shows a timing example of storing HD audio data.

FIG. 12 shows a timing example 1200 of storing HD audio data. The timing example 1200 includes a phone 141 communicatively linked to time-shift logic 1120, e.g., through a local network. The time-shift logic 1120 may include telephony logic 164, control logic 1130, A/V logic 161, transcoder logic 163, and recorder logic 1140, as seen in the timing example 1200. In operation, the time-shift logic 1120 may initiate an HD audio storing process upon receiving a record indication, such as receiving an HD audio service request specifying an audio data storing service. For example, the local user may press a predetermined combination of keys on the phone 141 specifying an audio record service. The phone 141 may then send DMTF tones 1210 corresponding to the key presses to the telephony logic 164. The telephony logic 164 may determine a service code associated with the DMTF tones 710, which may specify an HD audio recording service. The telephony logic 164 may also identify a specified audio source from a selected portion of the DTMF tones 1210, e.g., an audio selection string. In one example, a portion of the service request may also indicate a record duration that may specify an audio recording duration. The audio recording duration may include or represent a time length for recording audio data (e.g., hours, minutes, seconds, etc.). The telephony logic 164 may identify the record duration from the service request by extracting a predetermined portion of the DMTF tones 1210.

The telephony logic 164 may generate and send a service indication message 1212 to the control logic 1130, which may specify any combination of an audio recording request, a specified audio source, and a record duration. The control logic 1130, A/V logic 161, and transcoder logic 163 may then obtain initial audio data 322 from the specified audio source and transcode the initial audio data 322 into HD audio data 324 as similarly described in FIG. 3 above. For example, the control logic 1130, A/V logic 161, and transcoder logic 163 may exchange messaging such as a tuning request 314, tuning confirmation 316, configuration request 318, and configuration confirmation 320 in a similar fashion as described above.

The configuration request 318 may specify a destination indication to send transcoded audio data. For example, when the control logic 1130 identifies an HD audio record service, the control logic 1130 may generate a configuration request 318 that specifies the recording logic 1140 as a destination for sending transcoded audio data. Upon configuration, the transcoding logic 163 may send a configuration confirmation 1214 to the control logic 1130, which may indicate the transcoder logic 163 has completed a specified configuration, including a configuration to send transcoded audio data to the destination indication specified in the configuration request 318.

The control logic 1130 may send a record start message 1220 to the recorder logic 1140, which may provide a record instruction to the recorder logic 1140. The recorder logic 1140 may receive the HD audio data 1222 for recording, e.g., into the memory 1150. Upon initiating the audio recording, the control logic 1130 may send a recording initiation indication 1224 to the telephony logic 164, whereupon the telephony logic 164 may provide a recording initiation confirmation to the phone 141. The telephony logic 164 may send the recording initiation confirmation in any number ways, such as via a pre-recorded audio message, a predetermined sound or audio signal, or others. As seen in FIG. 11, the telephony logic 164 may send a dial-tone signal 1226 as the recording initiation confirmation. At this point, a local user may recognize that the time-shift logic 1120 has initiated the requested audio recording process and subsequently hang up the phone 141.

The recorder logic 1140 may continue to record HD audio data 1222 received from the transcoder logic 163 until obtaining a stop indication, such as receiving a recording stop message 1228 sent from the control logic 1130. The control logic 1130 may send the recording stop message 1228 to the recorder logic 1140 after a predetermined amount of time has elapsed, e.g., as specified by a record duration extracted from the service request. In the timing example 1200, the record duration length 1230 between when the recorder logic 1140 starts and stops recording HD audio data may correspond to a record duration value specified the HD audio recording service request. In an alternative example, the recorder logic 1140 may receive the record duration value through the record start message 1220. Then, the recorder logic 1140 may stop recording HD audio data 1222 after the amount of time specified by the record duration elapses. Thus, the time-shift logic 1120 may obtain and record HD audio data for a specified record duration and from a specified audio source.

Figure 13:
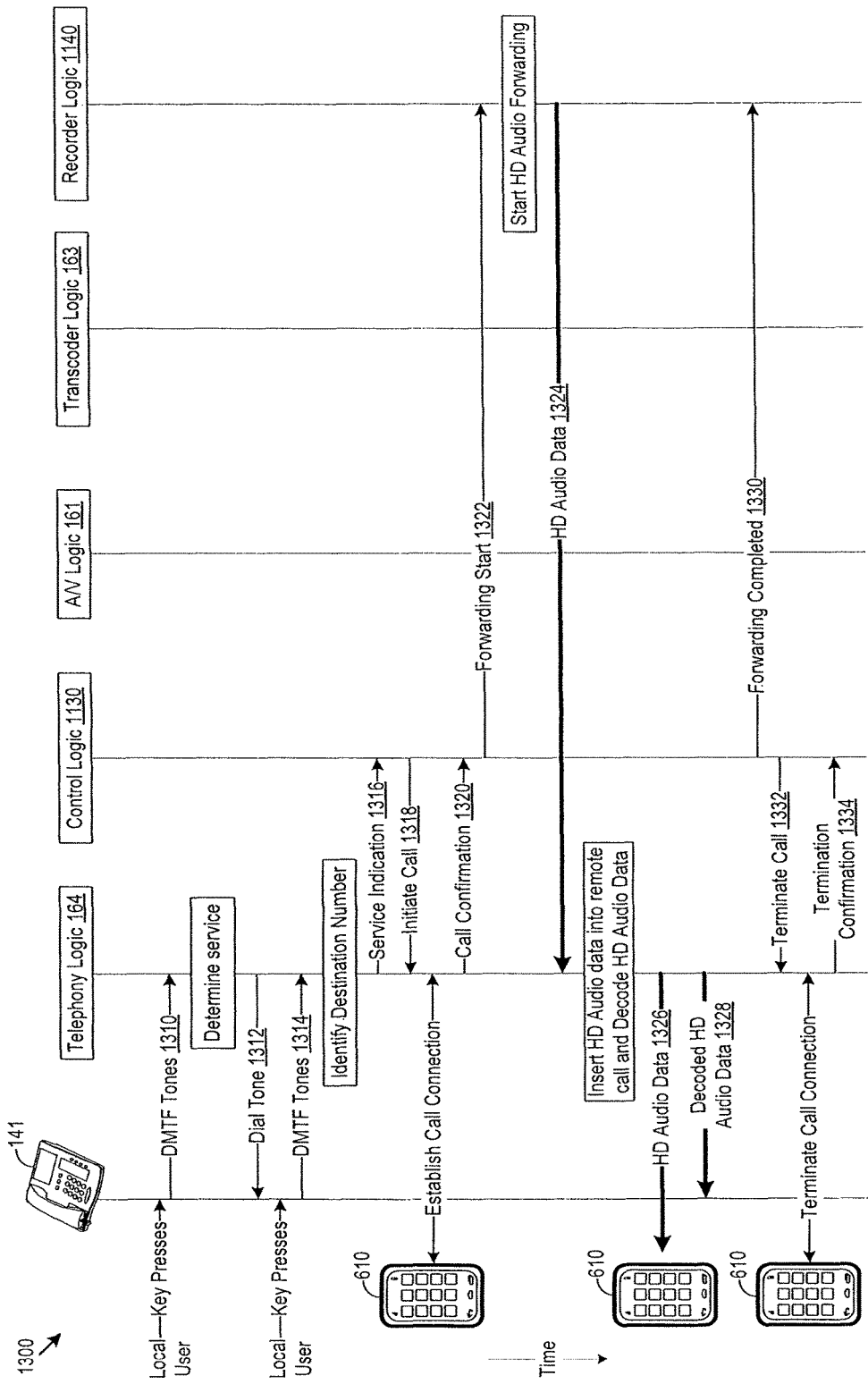
FIG. 13 shows a timing example of forwarding stored HD audio data.

FIG. 13 shows a timing example 1300 of forwarding stored HD audio data. The timing example 1300 includes the phone 141, which may be communicatively linked to the time-shift logic 1120. The time-shift logic 1120 may include telephony logic 164, control logic 1130, A/V logic 161, transcoder logic 163, and recorder logic 1140, as seen in the timing example 1300. In operation, the time-shift logic 1120 may forward (e.g., send) stored HD audio data to any number of destination devices. The timing example 1300 depicts an exemplary process through which the time-shift logic 1120 may send stored HD audio to the remote communication device 610. The time-shift logic 1120 may also send stored HD audio data to multiple remote communication devices in a similar manner. Alternatively or additionally, the time-shift logic 1120 may send the stored HD audio to any number of electronic devices connected via a local network as well, such as the phone 141.

The time-shift logic 1120 may initiate a stored HD audio forwarding process upon receiving a forwarding indication, e.g., upon receiving an HD audio service request that specifies a stored HD audio forwarding service. In FIG. 13, the local user may press a predetermined combination of keys on the phone 141 that may specify the stored audio forwarding service. The phone 141 may then send DMTF tones 1210 corresponding to the key presses to the telephony logic 164. Then, the telephony logic 164 may determine a service code associated with the DMTF tones 710, and may thus identify the HD audio recording service.

Upon determining the service request corresponds to a stored HD audio forwarding service, the telephony logic 164 may identify additional service information with respect to the stored HD audio forwarding service, such as a destination device. The destination device may refer to an electronic device the time-shift logic 1120 is to send the stored HD audio to. The destination device may be characterized by any number of identifying information, such as a phone number, speed dial number, IP address, any form of device code or categorization, or others. The telephony logic 164 may obtain identifying information associated with the destination device in various ways. In one example, the telephony logic 164 may send a dial-tone signal 1312 to the phone 141, for play back to the local user. The local user may enter key presses, and the phone 141 may subsequently send DMTF tones 1314, that may identify the destination device. Alternatively, the service request initially sent by the local user may include identifying information associated with the destination device. In the timing example 1300 in FIG. 13, the telephony logic 164 receives an identifying phone number specifying the remote communication device 610 as the destination device.

The time-shift logic 1120 may also obtain a stored audio selection, which may specify a particular stored HD audio stream or data. In one example, the time-shift logic 1120 may obtain a stored audio selection through a user query. For example, the telephony logic 164 and/or control logic 1130 may request identification, e.g., a listing, of available stored HD audio streams or data from the record logic 1140. Then, the telephony logic 164 may provide a stored HD audio options indication to the phone 212 for playback to the local user. The stored HD audio options indication may identify stored HD audio available for forwarding. For example, the stored HD audio options may list one or more HD audio streams or recordings stored in the memory 1150, allowing the local user to select one of the audio options as the stored audio selection. The stored HD audio options indication may also include audio identifying information for each stored HD audio stream or data, including as examples, an audio source the stored HD audio data was obtained from, a recording duration, a recording date, a recording description, or other information. The telephony logic 164 may obtain the stored audio selection from the local user, e.g., via a DMTF tone signal from the phone 141 corresponding to a key press of the local user.

Upon identifying additional service information with respect to the stored HD audio forwarding service, the telephony logic 164 may generate and send a service indication message 1316 to the control logic 1130. The service indication 1316 may specify the requested stored HD audio forwarding service and additional service information. The service indication 1316 may include the destination device or identifying information associated with the destination device. In FIG. 13, the service indication 1316 may include a phone number value identifying the remote communication device 610. The service indication 1316 may also include the stored audio selection.

The time-shift logic 1130 may also obtain supplemental audio data to send with stored HD audio data. For example, the time shift logic 1130 may obtain supplemental audio data describing the stored HD audio data, e.g., by generating a supplemental audio stream including any of the audio identifying information described above. The time-shift logic 1130 (e.g., any combination of the telephony logic 164, control logic 1130, transcoder logic 163, and recorder logic 1140) may also obtain supplemental audio data from a local user requesting the stored HD audio forwarding service. For example, the time-shift logic 1120 may obtain and/or record an audio message from the local user (e.g., a user greeting) that the time-shift logic 1120 may forward as a preamble prior to sending the stored HD audio data to the destination device.

After receiving the service indication 1316 and optionally obtaining supplemental audio data, the control logic 1130 may establish a call connection with the destination device, e.g., the remote communication device 610. To do so, the control logic 1130 may send an initiate call message 1318 to the telephony logic 164, whereupon the telephony logic 164 may attempt to establish a call connection with the remote communication device 610. In FIG. 13, the telephony logic 164 attempts to establish a call connection by initiating a phone call using the phone number of the remote communication device 610. If the telephony logic 164 is unable to establish a call connection with the remote communication device 610, the time-shift logic 1120 may abort the stored HD audio forwarding service, e.g., by foregoing further action and/or alerting the local user of the unsuccessful call connection attempt with the remote communication device 610. When the telephony logic 164 establishes a successful call connection with the remote communication device 610 (e.g., when the remote communication device 610 accepts an incoming call request from the telephony logic 164), the telephony logic 164 may send a call confirmation 1320 to the control logic 1130 indicating the successful call connection.

After receiving the call confirmation 1320, the control logic 1130 may forward stored HD audio data to the remote communication device 610, for example through the established call connection. In one example, the time-shift logic 1130 may send obtained supplemental audio data, such as a recorded preamble or greeting message from the local user, prior to sending the stored HD audio data. The control logic 1130 may also instruct the recorder logic 1140 to begin sending stored HD audio data through a forwarding start message 1322. The forwarding start message 1322 may include a stored audio selection indication, which may specify a particular HD audio stream or data for the recorder logic 1140 to retrieve from a memory to forward. Then, the recorder logic 1140 may retrieve the specified stored HD audio data and send the HD audio data 1324 to the telephony logic 164. To distribute the HD audio data 1324 to the remote communication device 610, the telephony logic 164 may encode or decode the HD audio data 1324 into a communication format supported by the call connection. The telephony logic 164 may then send the HD audio data 1326 to the remote communication device 610 via the call connection. The telephony logic 164 may also send the stored HD audio selection to the local user device that initiated the audio forwarding service, such as the phone 141. To do so, the telephony logic 164 may decode the HD audio data 1324 into a communication format supported by the phone 141 and send the decoded HD audio data 1328 to the phone 141.

The time-shift logic 1120 may continue to send the stored HD audio data to the remote communication device 610, phone 141, or both, until identifying a termination indication. The time-shift logic 1120 may identify a termination indication in any number of ways, including through any of the termination indications discussed above. As examples, the time-shift logic 1120 may identify a termination indication when the remote communication device 610 terminates the call connection, such as by sending a termination signal (e.g., on-hook signal) to the telephony logic 164. Or, the time-shift logic 1120 may identify a termination indication when the sending of the specified stored audio selection has completed. The control logic 1130 may identify when forwarding of the stored HD audio selection has completed, e.g., when a recording duration has elapsed or when receiving a forwarding complete indication from the recorder 1140 that the end of a specified stored HD audio stream or data has been reached.

In response to identifying a termination indication, the control logic 1130 may send a forwarding completed message 1330 to the recorder logic 1140, which may instruct the recorder logic 1140 to cease sending stored HD audio data 1324. Then, the control logic 1130 may send a terminate call message 1332 to the telephony logic 164, whereupon the telephony logic 164 may terminate the call connection with the remote communication device 610. Then, the telephony logic 164 may send a termination confirmation 1334 to the control logic 1130, which may conclude the stored HD audio forwarding service.

Figure 14:
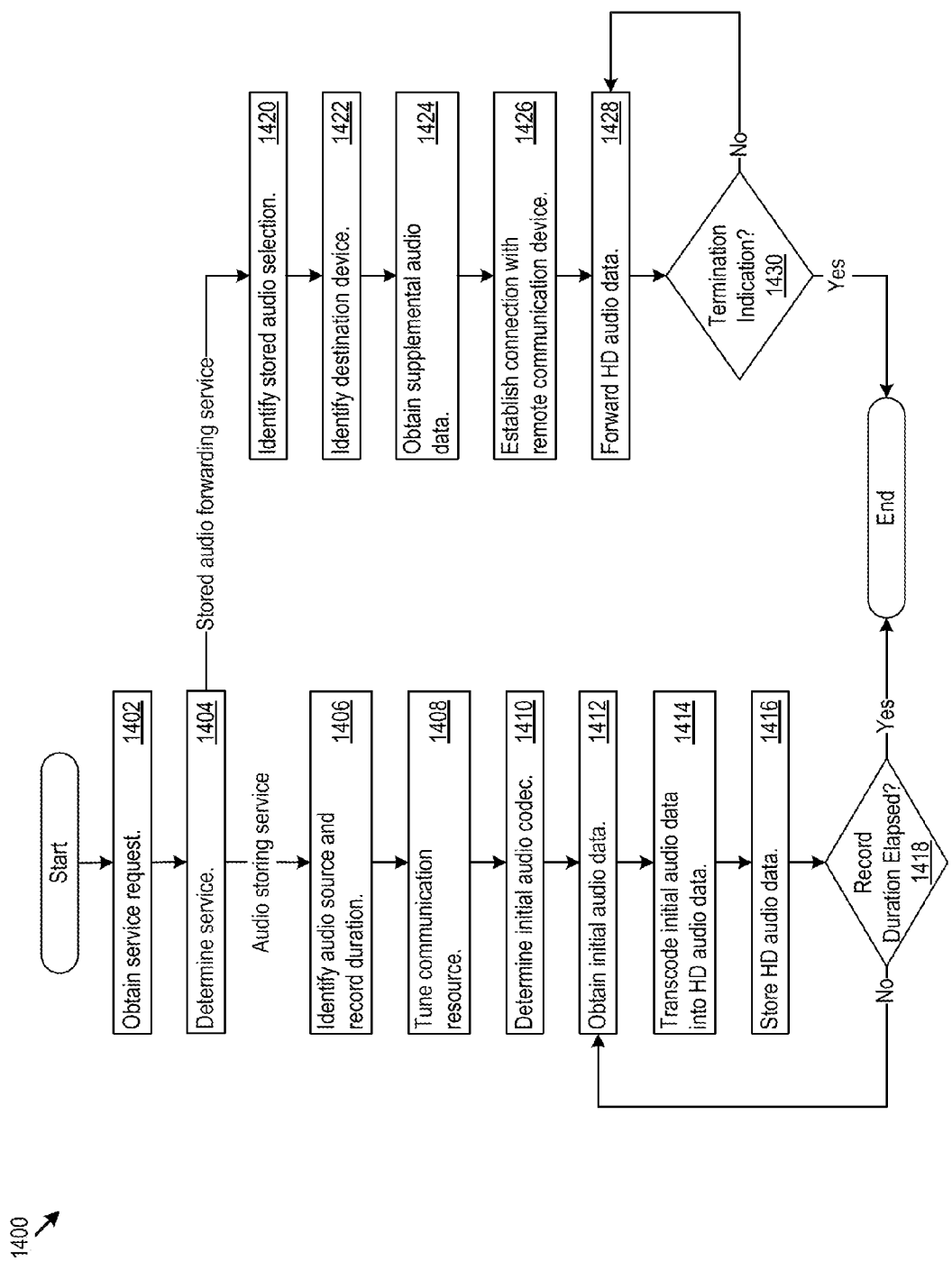
FIG. 14 shows an example of logic that may be implemented as hardware, software, or both.

FIG. 14 shows an example of logic 1400 that may be implemented as hardware, software, or both. For example, the time-shift logic 1120 may implement the logic 1400, e.g., through any combination of the A/V logic 161, broadband logic 162, transcoder logic 163, telephony logic 164, control logic 1130, or recorder logic 1140, and across any number of devices.

The time-shift logic 1120 may obtain a service request (1402) in any of the ways discussed above, e.g., as DMTF tones sent from the phone 141 operated by a local user. The time-shift logic 1120 may examine the service request and determine a service associated with the service request (1404). As examples, the time shift logic 1120 may determine that the obtained (e.g., received) service request specifies an HD audio storing service or a stored HD audio forwarding service.

When the service request specifies an HD audio storing service, the time-shift logic 1120 may identify an audio source from which to obtain and store audio data (1406). The time-shift logic 1120 may identify the audio source from a portion of service request, which may specify an audio source (e.g., a broadcast channel number, streaming source identification code, etc.) to record. The time-shift logic 1120 may also identify a record duration (1406) by examining a predetermined portion of the service request specifying a recording duration value. In an alternative example, the time-shift logic 1120 may send a query to the local user, e.g., via the phone 141, prompting the local user to provide a specified audio source, record duration, or both.

Then, the time-shift logic 1120 may obtain audio data from the specified audio source by, for example, tuning a communication resource to receive audio data from the specified audio source (1408), determining an initial codec associated with the audio data (1410), and obtaining the audio data from the specified audio source (1412), e.g., through the tuned communication resource. The time-shift logic 1120 may transcode the received audio data into HD audio data (1414) and store the HD audio data (1416) into a memory, e.g., an external memory or a memory embedded within a device implementing any portion of the time-shift logic 1120 or the memory 1150.

The time-shift logic 1120 may continue to obtain and store HD audio data for a length of time equal to the record duration. Until the record duration time elapses (1418), the time-shift logic 1120 may continue to obtain audio data from the specified audio source, transcode the audio data into HD audio data, and stored the HD audio data in the memory. In one example, the time-shift logic 1120 may store the audio data obtained from the specified audio source without transcoding the audio data into HD audio data. In this example, the time-shift logic 1120 may associate a transcoding indication with the stored audio data, which may indicate the stored audio data was not transcoded into an HD audio format prior to storing in the memory. The transcoding indication may also include the initial audio codec associated with the stored audio data. Also, the time-shift logic 1120 may employ any number of compression techniques to the audio data or HD audio data when storing the data into the memory. After the time-shift logic 1120 has obtained audio data (HD or according to an initial audio codec) for the record duration, the time-shift logic 1120 may complete the HD audio recording process.

The time-shift logic 1120 may also determined that an obtained service request specifies a stored HD audio forwarding service. In response, the time-shift logic 1120 may identify a stored audio selection (1420) and destination device (1422), such as through any of the ways discussed above. For example, the time-shift logic 1120 may obtain the stored audio selection as an explicit selection from the local user. The stored audio selection may include a time duration value associated with the stored audio selection. The time-shift logic 1120 may also obtain supplemental audio data (1424) to send with the stored audio selection. As discussed above, the supplemental audio data may include a pre-recorded or generated audio stream describing the stored audio selection, which may include any identifying information associated with the stored audio selection. Or the supplemental audio data may be a recorded audio greeting from the local user.

The time-shift logic 1120 may attempt to establish a connection with the destination device (1426). When the connection attempt fails, the time-shift logic 1120 may stop the stored HD audio forwarding process and/or send a failed connection indication to the local user, e.g., via the phone 141. When the time-shift logic 1120 successfully establishes a connection with the destination device, the time-shift logic 1120 may forward HD audio data of the stored audio selection to the destination device (1428). In one example, the time-shift logic 1120 may transcode audio data retrieved from a memory when the audio data was not previously transcoded into HD audio data. Also, the time-shift logic 1120 may encode or decode an HD audio data stream retrieved from a memory into a communication format supported by the communication link to the destination device. The time-shift logic 1120 may also decode and forward HD audio data to a local device initiating the stored HD audio forwarding service as well. The time-shift logic 1120 may continue to forward the stored HD audio data to the destination device until identifying a termination indication (1430), which may take the form of any of the termination indications discussed above.

Figure 15:
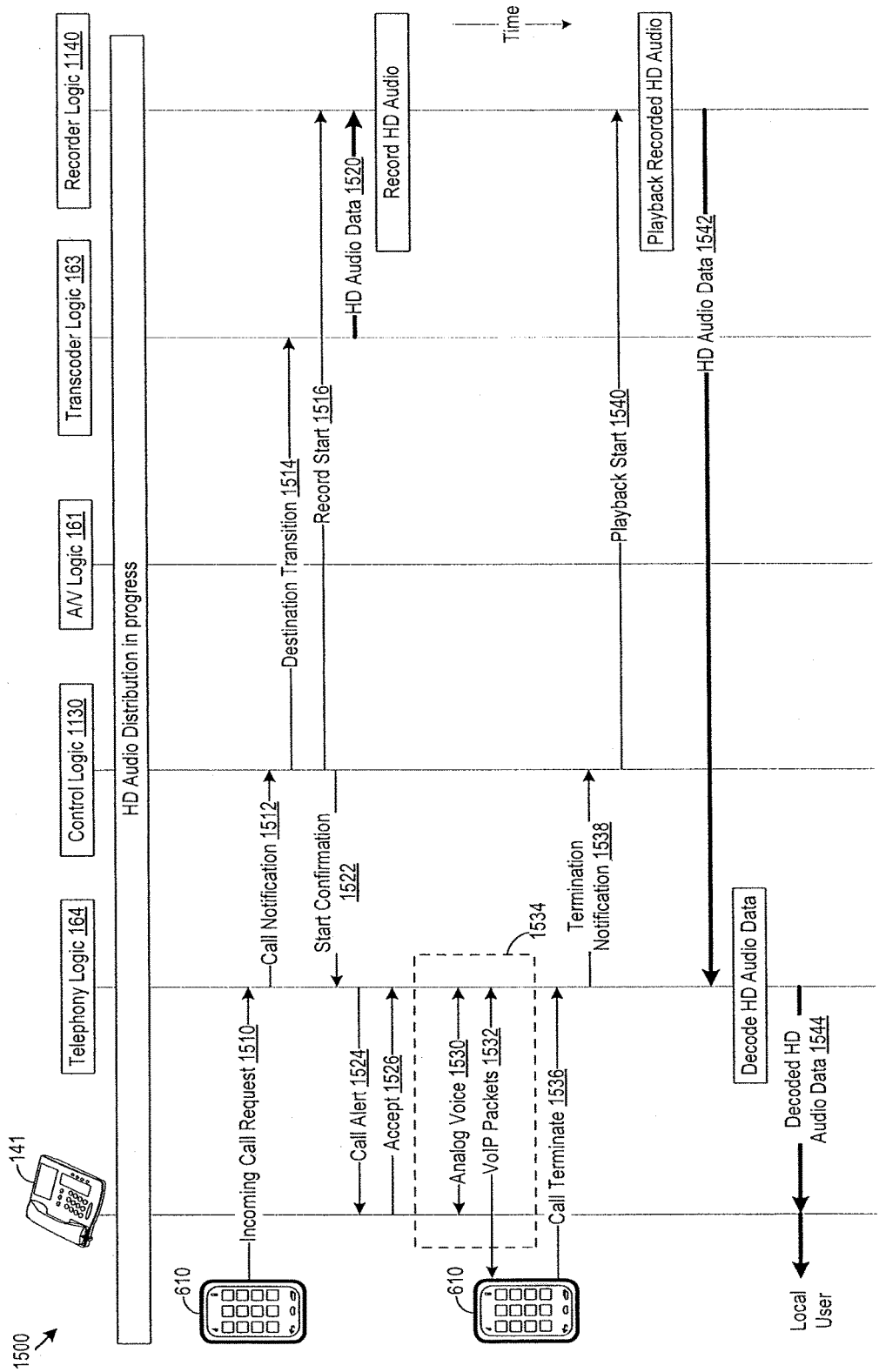
FIG. 15 shows a timing example of time-shifting the distribution of HD audio.

FIG. 15 shows a timing example 1500 of time-shifting the distribution of HD audio. The timing example 1500 includes the phone 141, which may be communicatively linked to the time-shift logic 1120, e.g., via a local analog network. The time-shift logic 1120 may include the telephony logic 164, control logic 1130, A/V logic 161, transcoder logic 163, and recorder logic 1140, as seen in the timing example 1500. In operation, the time-shift logic 1120 may time-shift the distribution of HD audio data upon identifying a time-shift indication. For example, and as seen in the timing example 1500, the time-shift logic 1120 may identify a time-shift indication when the time-shift logic 1120 receives an incoming call request during an HD audio distribution process. As described below, the time-shift logic 1120 may alert a local user of an incoming call and record the HD audio stream currently being distributed. In one instance, the time-shift logic 1120 may time-shift, e.g., delay, the distribution of the recorded HD audio until after a call between a remote communication device and a local phone device completes.

In the timing example 1500, an HD audio distribution process may occur prior to an incoming call request, e.g., via any of the HD distribution processes described above. While the distribution of HD audio distribution is in progress, the telephony logic 164 may identify an incoming call request to a communication device linked to the telephony logic 164, such as the incoming call request 1510 to the phone 141 from the remote communication device 610. In response to receiving the incoming call request 1510 during the HD audio distribution process, the telephony logic 164 may send an incoming call notification 1512 to the control logic 1130.

Then, the control logic 1130 may initiate a recording of the HD audio data currently being distributed until the incoming call request 1510 and/or subsequent call connection is resolved.

The A/V logic 161 may continue to obtain initial audio data from the specified audio source of the HD distribution process and the transcoder logic 163 may continue to transcode the initial audio data into HD audio data. During the time-shifting process, the transcoder logic 163 may send the transcoded HD audio data to the recorder logic 1140 for recording instead of to the telephony logic 164 for play back to the local user. To do so, the control logic 1130 may send a destination transition indication 1514 to the transcoder logic 163, which may instruct the transcoder logic 163 to send transcoded HD audio data 1520 to the recorder logic 1140. The control logic 1130 may also send a record start message 1516 to the recorder logic 1140, which may initiate storing of HD audio data 1520 sent from the transcoder logic 163 to the recorder logic 1140.

The control logic 1130 may send a recording start confirmation 1522 to the telephony logic 164, whereupon the telephony logic 164 may send an incoming call indication to the phone 141, such as through the call alert 1524. In one example, the telephony logic 164 may send a call alert 1524 as a local ring tone to the phone 141, which may interrupt the previous HD audio distribution and alert the local user of the incoming call request 1510. The time-shift logic 1120 may cease the HD audio distribution until completion of the call request or connection.

When a local user accepts the incoming call request 1510, the phone 141 may send a call acceptance indication, such as the accept message 1526 in FIG. 15. Then, the telephony logic 164 may support the call connection 1534, by exchanging voice signals between the phone 141 and the remote communication device 610. To that end, the telephony logic 164 may send and receive an analog voice signal 1530 from the phone 141 and the VoIP packet voice signal 1532 from the remote communication device 610. The telephony logic 164 may identify a call termination indication, such as when the remote communication device 610 sends an on-hook signal or termination signal 1536 to the telephony logic 164. Then, the telephony logic 164 may send a call termination notification 1538 to the control logic 1130.

Upon identifying resolution of the incoming call request 1510 or subsequent call connection 1534, the control logic 1130 may send a playback start indication 1540 to the recorder logic 1140. The recorder logic 1140 may send recorded HD audio data 1542 starting from a point when the previous HD audio distribution ceased, e.g., upon receiving the incoming call request 1510 and sending the call alert 1524 to the phone 141. The recorder logic 1140 may send the recorded HD audio data 1542 to the telephony logic 164 for decoding and distribution to the phone 141 as decoded HD audio data 1544. The phone 141 may play back the decoded HD audio 1544, thus resuming distribution of HD audio from a point where the distribution was interrupted by the incoming call request 1510. The time-shift logic 1120 may continue to time-shift the HD audio distribution (e.g., record and subsequently distribute) until identifying a distribution termination indication, such as receiving an on-hook signal or predetermined termination signal from the phone 141.

Figure 16:
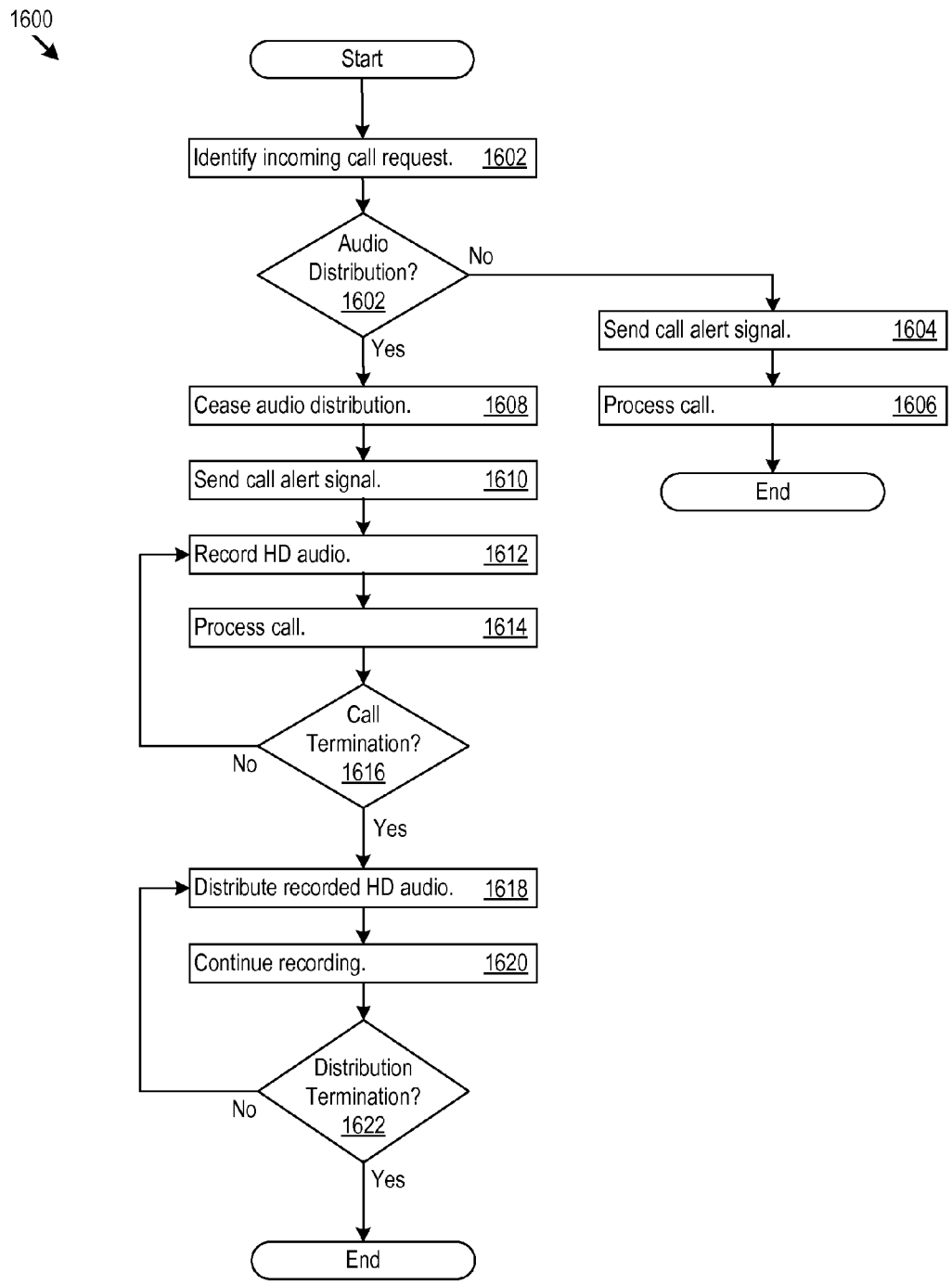
FIG. 16 shows an example of logic that may be implemented as hardware, software, or both.

FIG. 16 shows an example of logic 1600 that may be implemented as hardware, software, or both. For example, the time-shift logic 1120 may implement the logic 1600, e.g., through any combination of the A/V logic 161, broadband logic 162, transcoder logic 163, telephony logic 164, control logic 1130, or recorder logic 1140, and across any number of devices.

The time-shift logic 1120 may identify an incoming call request (1602) from a remote communication device 610 directed to any communication device linked to the time-shift logic 1120, e.g., phone devices connected to the time-shift logic 1120 via a local analog phone network. In response, the time-shift logic 1120 may identify whether an audio distribution process is currently in progress, e.g., by identifying whether the time-shift logic 1120 or other interconnected logic (e.g., distribution logic 160) is currently distributing HD audio across. When an audio distribution process is not currently in progress, the time-shift logic 1120 may send a call alert signal (1604) to a communication device identified by the incoming call request and subsequently process a call connection (1606) between the remote communication device and the communication device.

When, the time-shift logic 1120 determines that the incoming call request occurs during an audio distribution process, the time-shift logic 1120 may delay the distribution of the currently distributed audio stream, for example, until the incoming call request or a subsequent call connection completes. To that end, the time-shift logic 1120 may cease the distribution of HD audio data (1608), send a call alert signal (1610) to one or more communication devices identified by the incoming call request, and record HD audio data (1612) from the audio source that was distributed prior to receiving the incoming call request. The time-shift logic 1120 may also process a call connection (1614) between the remote communication device and the communication device identified by the incoming call request, e.g., a local communication device such as the phone 141.

The time-shift logic 1120 may continue to record HD audio data corresponding to the previously distributed audio source and process the call connection until identifying a call termination indication (1616), such as upon receiving an on-hook signal from remote communication device 610 or any other call termination indication. Then, the time-shift logic 1120 may distribute, e.g., playback, the recorded HD audio (1618) starting, for example, from the point the previous HD audio distribution process was interrupted by the incoming call request. In this way, the time-shift logic 1120 may resume distribution of HD audio data without skipping audio content as a result of the incoming call request during the previous HD audio distribution. The time-shift logic 1120 may also continue to record HD audio data from the specified audio source (1620) for subsequent distribution (1618), thereby time-shifting the distribution of the HD audio data.

The time-shift logic 1120 may continue to time-shift the distribution of the interrupted HD audio data stream until identifying a distribution termination indication (1622), such as any of the distribution termination indications discussed above. For example, the time-shift logic 1120 may identify a termination indication upon receiving an on-hook signal from a communication device the HD audio data is distributed to. The time-shift logic 1120 may also end the HD audio time-shifting process under other time-shift termination circumstances as well, such as when the time-shift logic 1120 or other logic obtains an audio source change request, when the memory exceeds a memory capacity threshold, when the recorded audio duration exceeds a predetermined duration threshold, or under other termination circumstances. Thus, the time-shift logic 1120 may time-shift the distribution of HD audio data or an HD audio data stream to handle an incoming call request.

Figure 17:
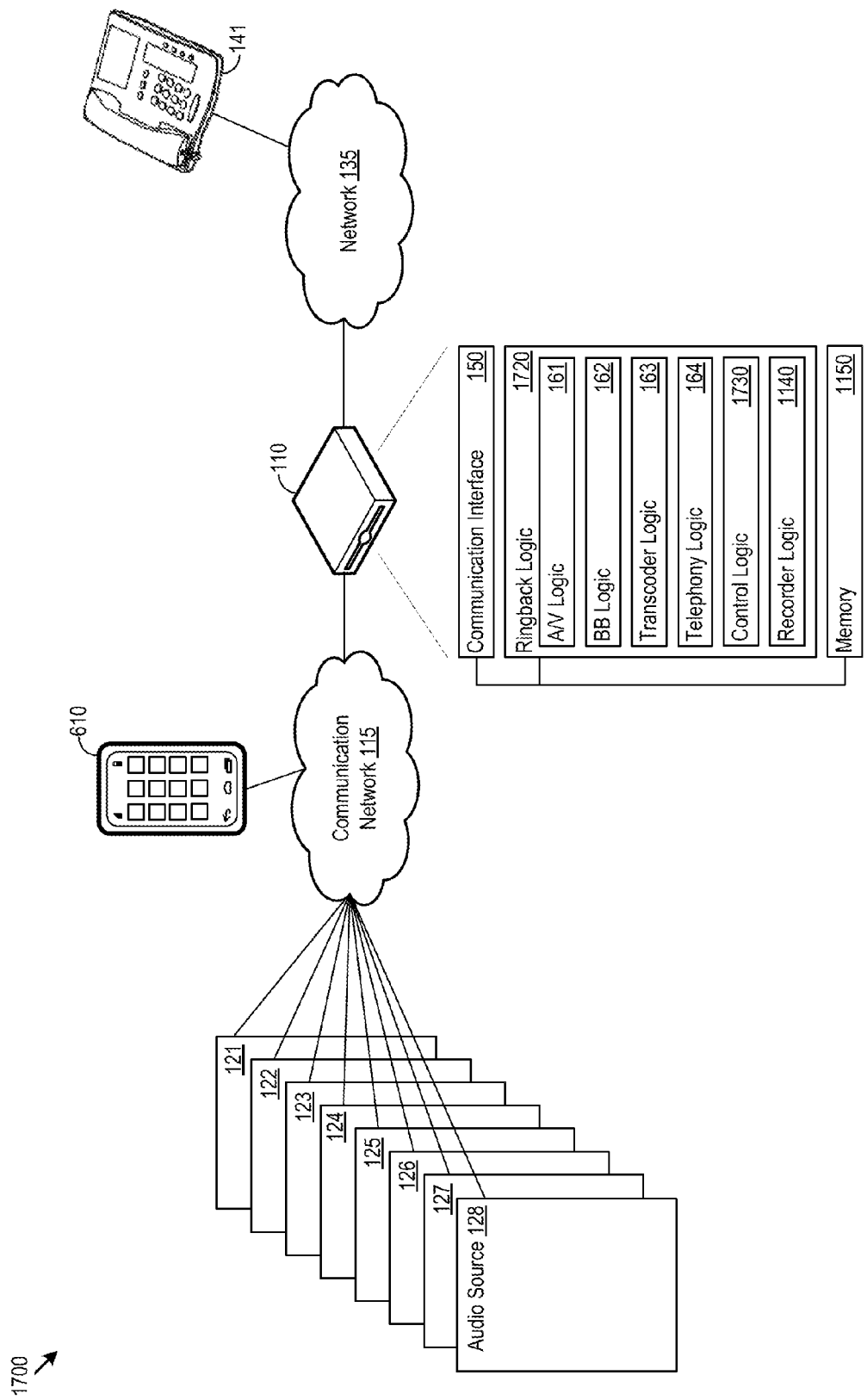
FIG. 17 shows an example of a system for sending HD audio as a ringback tone.

FIG. 17 shows an example of a system for sending HD audio as a ringback tone. A ringback tone may refer to an audio signal sent to and played back by a communication device while the communication device directs a call to a target communication device. The exemplary system 1700 or any portion thereof may share any number of common characteristics or elements with respect to FIGS. 1, 6, and 11 above, including with respect to the distribution device 110, communication network 115, audio sources 121-128, network 135, phone 141, and remote communication device 610. In FIG. 17, the distribution device 110 includes a communication interface 150 and the ringback logic 1720. The ringback logic 1720 may include the A/V logic 161, broadband logic 162, transcoder logic 163, telephony logic 164, and recorder logic 1140, as described above. The ringback logic 1720 may also include the control logic 1730 for sending HD audio as a ringback tone. As described in greater detail below, the ringback logic 1720 may identify an incoming call from a remote communication device (e.g., the remote communication device 610), identify a ringback audio source, and send audio data from the ringback audio source to the remote communication device as a ringback tone.

Figure 18:
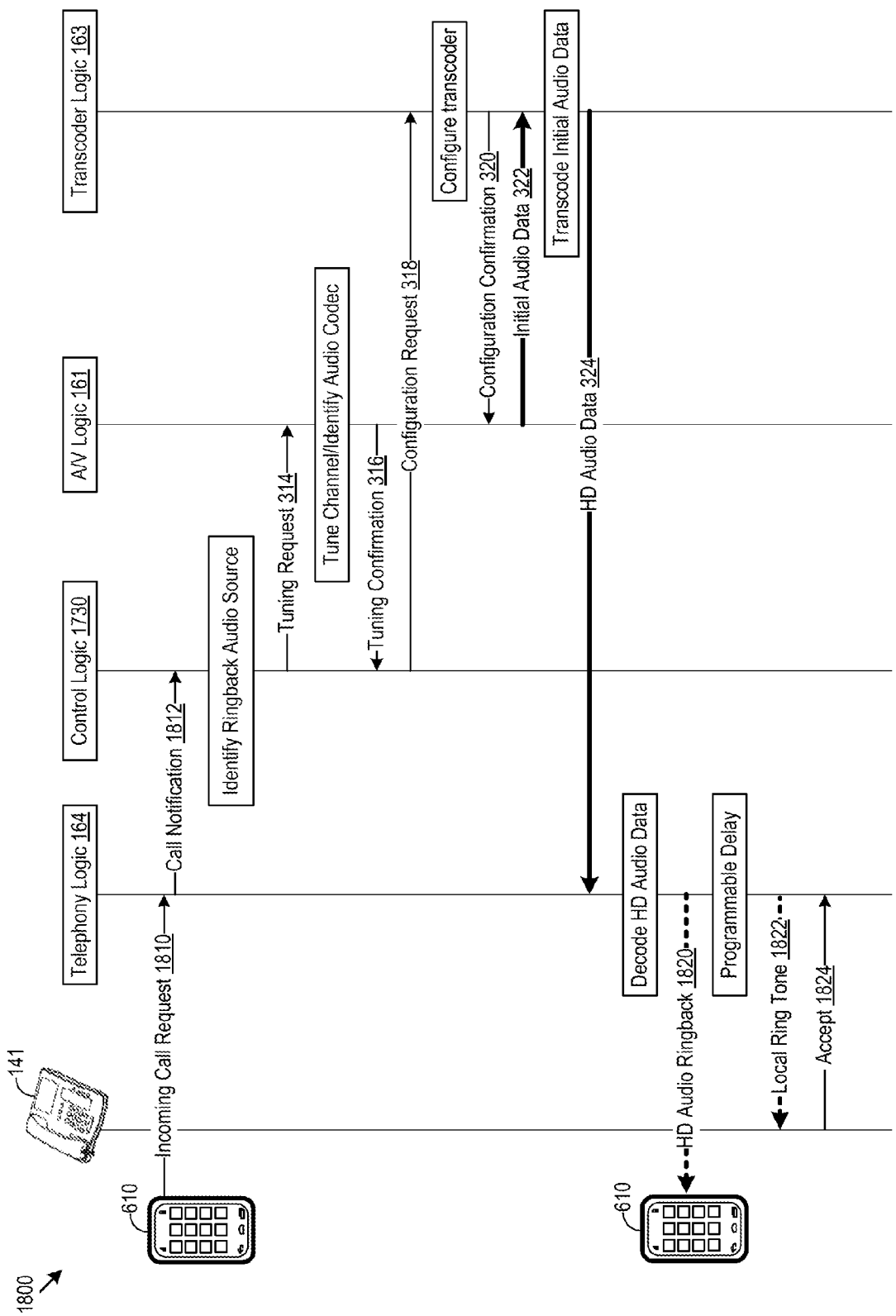
FIG. 18 shows a timing example of sending live HD audio as a ringback tone.

FIG. 18 shows a timing example 1800 of sending live HD audio as a ringback tone. The timing example 1800 includes the phone 141, which may be communicatively linked to ringback logic 1720, e.g., via an analog telephony network. The ringback logic 1720 may include the telephony logic 164, control logic 1730, A/V logic 161, and transcoder logic 163, as seen in the timing example 1800. In operation, the ringback logic 1720 may send live HD audio as a ringback tone to a remote communication device sending an incoming call request.

The remote communication device 610 may send an incoming call request 1810 to a requested communication device communicatively linked to the ringback logic 1720, such as the phone 141. For example, In FIG. 18, the phone 141 connects to a distribution device 110 implementing the ringback logic 1720 through a local analog phone network. The telephony logic 164 may identify and receive the incoming call request 1810, and in response send an incoming call notification 1812 to the control logic 1730. Then, the control logic 1730 may identify a ringback audio source to obtain a ringback tone for sending to the remote communication device 610. In one example, the control logic 1730 may identify the ringback audio source as any audio source, e.g., a broadcast A/V channel, streaming audio, or any of the audio sources discussed above.

The ringback audio source may be specified or configured in any number of ways. For example, the ringback logic 1720 may receive an audio service request that may specify a ringback audio source change service. The ringback logic 1720 may receive such a service request in any ways described above, e.g., via DMTF tones generated based on a local user's key presses. In another example, the ringback logic 1720 may interface with an operator-provided web interface to receive ringback audio source changes. In each of these examples, a local user may specify, configure, or change a previously specified ringback audio source.

The control logic 1730 may also identify a ringback audio source according to any number of ringback selection criteria. As examples, the ringback selection criteria may include time criteria which may specify a particular ringback audio source depending on the time-of-day, week, or month. The ringback selection criteria may include call identification criteria, which may specify a particular ringback audio source based on caller identification information of the remote communication device 610 sending the incoming call request. The ringback selection criteria may specify a particular ringback audio source according to a selected portion of the caller identification information associated with the remote communication device 610, e.g., with respect to the area code of the remote communication device 610. Or, the ringback selection criteria may specify a particular ringback audio source for specific phone number, thus allowing customization of the ringback audio source based on the identity or identification information of the remote communication device 610. Similar ringback selection criteria may include location-based criteria (e.g., GSP location info of the remote communication device 610) or any other criteria. In one example, the ringback selection criteria may be configurable, e.g., by a local user or by a network operator.

As one example in FIG. 18, the control logic 1730 may identify a ringback audio source as live audio data from a selected audio source and subsequently tune a communication resource to obtain audio data from the ringback audio source. The control logic 165, A/V logic 161, and transcoder logic 163 may obtain initial audio data 322 from the specified audio source and transcode the initial audio data 322 into HD audio data 324, as described above. For example, the control logic 165, A/V logic 161, and transcoder logic 163 may exchange messaging such as a tuning request 314, tuning confirmation 316, configuration request 318, and configuration confirmation 320 in a similar fashion as described above. The ringback logic 1720 may also obtain HD audio data from a streamed audio data using a streaming client as similarly described above. The transcoder logic 163 may send a transcoded audio data, e.g., the HD audio data 324, to the telephony logic 164.

The telephony logic 164 may encode or decode the HD audio data 324 into a communication format supported by a communication link with the remote communication device 610. For example, the telephony logic 164 may decode the HD audio data 324 into VoIP packets for transmission to the remote communication device 610. The telephony logic 164 may then send the HD audio data to the remote communication device 610 for play back as a ringback tone, e.g., the HD audio ringback signal 1820. The telephony logic 164 may continue to send the HD audio ringback signal 1820 until a requested communication device accepts the incoming call request or other ringback termination conditions occur, e.g., after a predetermined termination time elapses without receiving a call acceptance signal from the requested communication device.

After sending the HD audio ringback signal 1820, the ringback logic 164 may also alert the requested communication device of the incoming call request. In FIG. 18, the incoming call request 1810 may be directed to the phone 141. Thus, the telephony logic 164 may send a local ring tone signal 1822 to the phone 141 to indicate an incoming call request directed to the phone 141. In one example, the telephony logic 164 may send the HD audio ringback signal 1820 to the remote communication device 610 and delay alerting the requested communication device of the incoming call request, e.g., delay sending the local ring tone signal 1822. The telephony logic 164 may delay alerting the requested communication device of the incoming call request for a predetermined delay period, so that the remote communication device 610 receives the HD audio ringback signal 1820 for at least the predetermined delay period. The delay period may be a programmable or predefined time value stored by the telephony logic 164.

Figure 19:
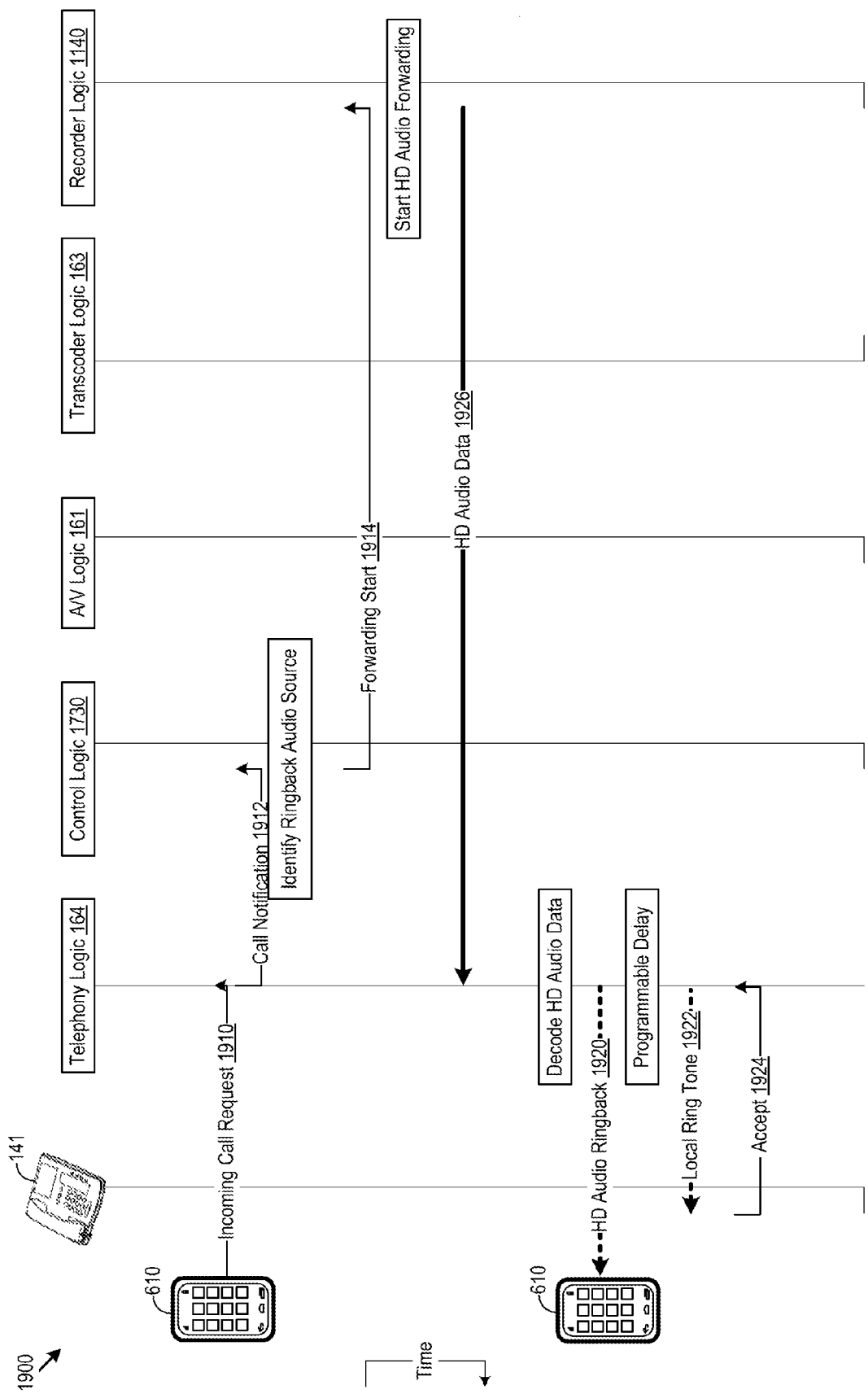
FIG. 19 shows timing example of sending recorded HD audio as a ringback tone.

FIG. 19 shows timing example 1900 of sending recorded HD audio as a ringback tone. The timing example 1900 includes the phone 141, which may be communicatively linked to ringback logic 1720 through a local analog network. The ringback logic 1720 may include the telephony logic 164, control logic 1730, A/V logic 161, transcoder logic 163, and recorder logic 1140, as seen in the timing example 1900. In operation, the ringback logic 1720 may send recorded HD audio as a ringback tone to a remote communication device sending an incoming call request.

In the timing example 1900, the telephony logic 164 may identify the incoming call request 1910 from the remote communication device 610. In response, the telephony logic 164 may send an incoming call notification 1912 to the control logic 1730. Then, the control logic 1730 may identify a ringback audio source to obtain a ringback tone for sending to the remote communication device 610. For example, the ringback logic 1720 may identify the ringback audio source according to any number of ringback selection criteria, as discussed above. In the timing example 1900, the control logic 1730 may identify the ringback audio source as a recorded HD audio stream or data, which may be stored on a memory, such as the memory 1150. Then, the control logic 1730 may send a forwarding start indication 1914 to the recorder logic 1140, which may also specify a particular stored audio data stream or data for the recorder logic 1140 to retrieve from the memory. The recorder logic 1140 may obtain HD audio data specified by the ringback audio source and send the HD audio data 1926 to the telephony logic 164.

The telephony logic 164 may encode or decode the HD audio data 1926 into a communication format supported by a communication link with the remote communication device 610 and send the HD audio data to the remote communication device 610 for play back as a ringback tone, e.g., send the HD audio ringback signal 1920. The telephony logic 164 may continue to send the HD audio ringback signal 1920 and wait for a delay period until alerting the phone 141 of the incoming call request (e.g., via sending a local ring tone signal 1922). Upon receiving a call accept signal 1924 from the phone 141, the telephony logic 164 may cease sending the HD audio ringback signal 1920, local ring tone signal 1922, or both.

Figure 20:
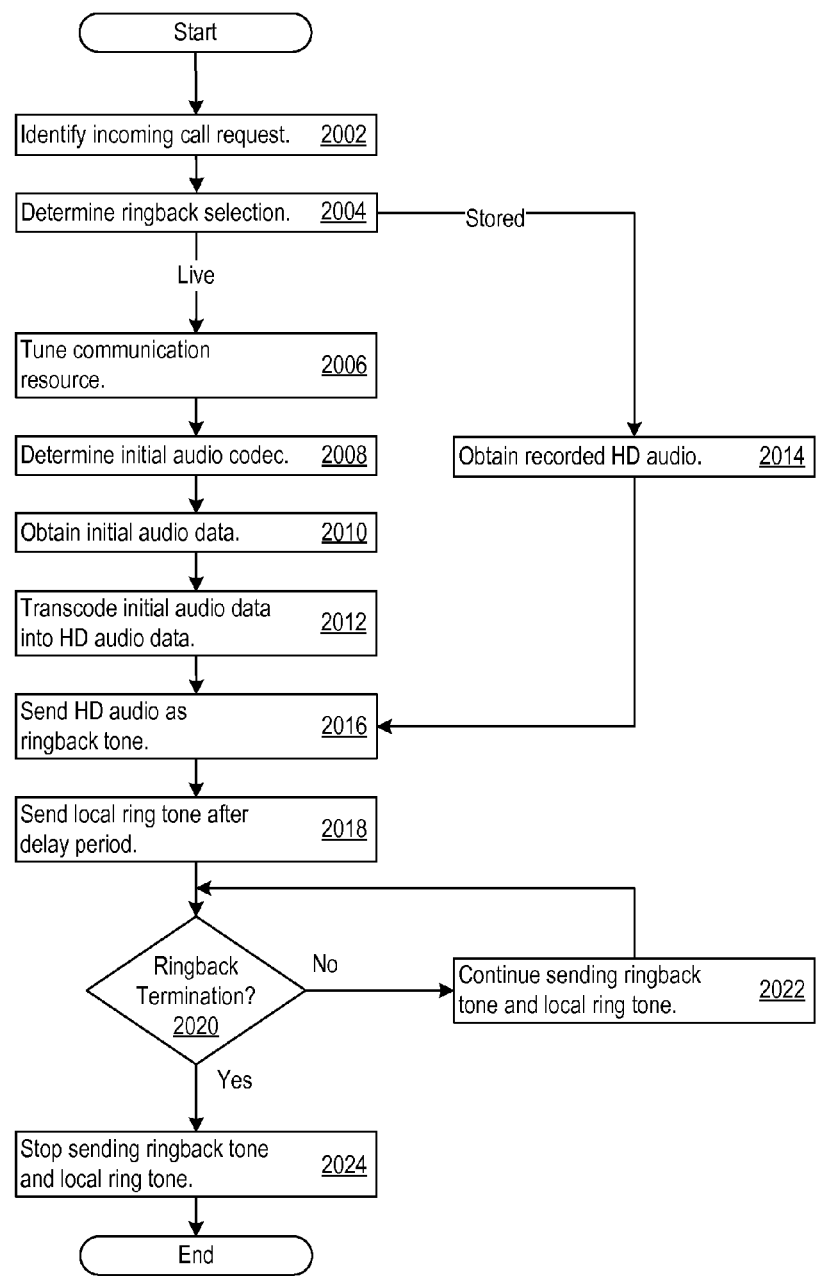
FIG. 20 shows an example of logic that may be implemented as hardware, software, or both.

FIG. 20 shows an example of logic 2000 that may be implemented as hardware, software, or both. For example, the ringback logic 1720 may implement the logic 2000, e.g., through any combination of the A/V logic 161, broadband logic 162, transcoder logic 163, telephony logic 164, control logic 1730, or recorder logic 1140, and across any number of devices. The ringback logic 1720 may identify an incoming call request from a communication device, such as the remote communication device 610 (2002). Then, the ringback logic 1720 may determine a ringback selection (2004), which may include determining a ringback audio source and/or particular audio data associated with the ringback audio source. The ringback logic 1720 may determine the ringback selection according to any number of ringback selection criteria, including any of the criteria discussed above.

In one example, the ringback selection criteria may specify advertising content as the ringback audio source. For example, the ringback logic 1720 may identify a ringback audio source containing advertising content stored on a memory, e.g., the memory 1150. The advertising content may have been previously selected by a local user or other entity, extracted from a broadcast channel, and recorded unto the memory 1150 by the ringback logic 1720. Or, the recorded advertising content may have been provided by a local network operator or service-provider, e.g., pre-downloaded onto a memory provided by the network operator or service provider. As another example, the ringback selection criteria may specify one or more broadcast or streaming ringback audio sources specifically including advertising content. The ringback selection criteria may be configured to specifically identify the advertisement ringback audio sources, e.g., by a network operator or service provider.

The ringback logic 1720 may obtain HD audio data from the ringback audio source, which may include an audio source providing a live audio stream or an audio source storing recorded audio data. When the ringback selection specifies an audio source sending live audio data, the ringback logic 1720 may obtain audio data from the audio source in any of the ways described above. For example, the ringback logic 1720 may tune a communication resource (2006), determine an initial audio codec associated with audio data obtained from the audio source (2008), obtain initial audio data (2010), and transcode the initial audio data into HD audio data (2012) in any of the ways described above. When the ringback selection specifies audio data from an audio source storing recorded audio data, the ringback logic 1720 may obtain recorded HD audio according to the ringback selection (2014), e.g., by retrieving a particular HD audio data stream or HD audio data from a memory based on the ringback selection.

Then, the ringback logic 1720 may send the obtained HD audio data as a ringback tone (2016) to the remote communication device 610 sending the incoming call request. The ringback logic 1720 may also alert the request communication device of an incoming request after a delay period, e.g., by sending a local ring tone signal to the requested communication device after the delay period elapses (2018).

The ringback logic 1720 may identify ringback termination indication (2020) in various ways, including, for example, when the requested communication device sends a call accept indication or after a predetermined termination period elapses. The ringback logic 1720 may continue to obtain and send the HD audio data as a ringback tone to the remote communication device 610 until identifying a ringback termination (2022). Similarly, the ringback logic 1720 may continue to send a local ring tone to the requested communication device until identifying a ringback termination indication as well. When the ringback logic 1720 identifies a ringback termination indication, the ringback logic 1720 may cease sending the ringback tone and local ring tone to the remote communication device 610 and requested communication device respectively. Thus, as described above, the ringback logic 1720 may send HD audio data as a ringback tone to a remote communication device 610 sending an incoming call request.

The distribution logic 160, time-shift logic 1120, and ringback logic 1720, or any portion thereof, may share any number of common characteristics, elements, functionality, or more. Also, the distribution logic 160, time-shift logic 1120, and ringback logic 1720 may be implemented together in any combination. For any of the audio distribution services described above, the distribution logic 160, time-shift logic 1120, ringback logic 1720, or any combination thereof may determine a distribution eligibility of a distribution service or user. The logic may determine whether a distribution threshold has been exceeded (e.g., amount of time, data, or other metric). For example, a network provider or service provider may specify a predetermined distribution threshold to a local user, set of communication devices, service, telephone account, etc., with respect to one or more HD audio distribution services. The distribution logic 160, time-shift logic 1120, and ringback logic 1720 may forego providing a requested HD audio service when the predetermined distribution threshold is exceeded. In one example, the distribution threshold may be increased (e.g., by a local user or with respect to a particular account), e.g., by paying a monetary amount to the service or network provider.

The methods, devices, and logic described above may be implemented in many different ways in many different combinations of hardware, software or both hardware and software. For example, all or parts of a system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments have been described, it will be apparent to those of ordinary skill in the art that many more embodiments and implementations are possible. Accordingly, the systems and methods are not to be restricted except in light of the attached claims and their equivalents.

What is claimed is:

1. A device comprising:
   a memory;
   a communication interface; and
   a processor connected with the memory and the communication interface, the processor configured to process time-shift logic, the time-shift logic configured to:
   receive a record indication from a communication device, the record indication specifying an audio selection, and in response:
   tune the communication interface to obtain initial audio data according to the audio selection;
   transcode the initial audio data into High Definition (HD) Voice data; and
   store the HD Voice data in the memory; and
   receive a forward indication from the communication device, and in response:
   determine a destination device; and
   transmit the HD Voice data stored in the memory to the destination device through the communication interface.

2. The device of claim 1, where the destination device comprises the communication device.

3. The device of claim 1, where the destination device comprises a remote communication device.

4. The device of claim 3, where the time-shift logic is configured to transmit the HD Voice data to the remote communication device by establishing a call connection with the remote communication device.

5. The device of claim 1, where the time-shift logic is further configured to:
   obtain a recorded audio preamble message from the communication device; and
   transmit the recorded audio preamble message to the destination device along with the HD Voice data.

6. The device of claim 1, where the time-shift logic is configured to determine the destination device by obtaining identifying information associated with the destination device.

7. The device of claim 6, where the identifying information associated with the destination device comprises a phone number.

8. A device comprising:
   a memory;
   a communication interface; and
   a processor connected with the memory and the communication interface, the processor configured to process time-shift logic, the time-shift logic configured to:
   distribute High Definition (HD) Voice data to a communication device;
   identify an incoming call request directed to the communication device while distributing the HD Voice data, and in response:
   store the HD Voice data in the memory instead of distributing the HD Voice data; and
   process the incoming call request.

9. The device of claim 8, where the time-shift logic is configured to process the incoming call request by sending a call alert to the communication device.

10. The device of claim 8, where the time-shift logic is configured to process the incoming call request by establishing a call connection with the communication device and a call device that sent the incoming call request.

11. The device of claim 8, where the time-shift logic is further configured to:
    identify a call termination indication; and in response:
    resume distributing the HD Voice data by sending the HD Voice data stored in the memory to the communication device.

12. The device of claim 11, where the time-shift logic is configured to resume distributing the HD Voice data from a point when the incoming call request was identified.

13. The device of claim 11, where the time-shift logic is further configured to continue storing the HD Voice data while resuming distribution of the HD Voice data.

14. The device of claim 11, where the call termination indication comprises an on-hook signal from a calling device that sent the incoming call request.

15. A device comprising:
    communication interface circuitry;

time-shift logic circuitry configured to receive a service request indication from a first communication device, the service request indication specifying an audio selection;

the time-shift logic circuitry further configured to tune the communication interface circuitry to obtain initial audio data according to the audio selection specified in the service request indication;

the time-shift logic circuitry further configured, in response to receipt of a record request, to initiate a High Definition (HD) storage process comprising use of transcoder logic circuitry and recorder logic circuitry; the transcoder logic circuitry configured to transcode the initial audio data received by the communication interface circuitry into HD Audio data; and the recorder logic circuitry configured to record the HD Audio data in a memory for subsequent distribution.

16. The device of claim 15 wherein the service request indication further specifies an identifier indicative of a second communication device, the time-shift logic circuitry is further configured, in response to the service request identifier, to connect with the second communication device associated with the identifier and initiate distribution of the HD Audio data stored in the memory to the second communication device.

17. The device of claim 15 wherein the time-shift logic circuitry is configured to include telephony logic circuitry configured to receive a voice signal from a second communication device; and mixing logic circuitry configured to mix the HD Audio data stored in the memory with the voice signal into a mixed signal; wherein the telephony logic circuitry is further configured to distribute the mixed signal to the first communication device.

18. The device of claim 17 wherein the time-shift logic circuitry is further configured to receive the service request from the second communication device in addition to the first communication device.

19. The device of claim 17 wherein the voice signal is an analog signal and the mixed signal is a VoIP signal.

20. The device of claim 17 wherein the voice signal is a VoIP signal and the mixed signal is an analog signal.

* * * * *